United States Patent
Fujimoto et al.

(10) Patent No.: US 11,400,539 B2
(45) Date of Patent: Aug. 2, 2022

(54) FLUX-CORED WIRE, MANUFACTURING METHOD OF WELDED JOINT, AND WELDED JOINT

(71) Applicant: NIPPON STEEL CORPORATION, Tokyo (JP)

(72) Inventors: Hiroki Fujimoto, Tokyo (JP); Kotaro Watanabe, Tokyo (JP); Yasuhito Totsuka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 464 days.

(21) Appl. No.: 16/344,766

(22) PCT Filed: Nov. 8, 2016

(86) PCT No.: PCT/JP2016/083082
§ 371 (c)(1),
(2) Date: Apr. 24, 2019

(87) PCT Pub. No.: WO2018/087812
PCT Pub. Date: May 17, 2018

(65) Prior Publication Data
US 2019/0329347 A1    Oct. 31, 2019

(51) Int. Cl.
*B23K 35/02*    (2006.01)
*B23K 9/173*    (2006.01)
(Continued)

(52) U.S. Cl.
CPC .......... *B23K 9/1735* (2013.01); *B23K 9/164* (2013.01); *B23K 9/24* (2013.01); *B23K 35/0266* (2013.01);
(Continued)

(58) Field of Classification Search
CPC ........ B23K 9/1735; B23K 9/164; B23K 9/24; B23K 35/0266; B23K 35/3073;
(Continued)

(56) References Cited

U.S. PATENT DOCUMENTS 10,946,486 B2 *  3/2021  Watanabe .............. B23K 35/30
2012/0241433 A1  9/2012  Kojima et al.
(Continued)

FOREIGN PATENT DOCUMENTS

CA    2 926 569 A1    5/2015
CN    101559546 A    10/2009
(Continued)

OTHER PUBLICATIONS

"Method for measurement of amount of hydrogen evolved from steel welds", JIS Z 3118: 2007, total of 60 pages.
(Continued)

*Primary Examiner* — Brian W Jennison
*Assistant Examiner* — Abigail H Rhue
(74) *Attorney, Agent, or Firm* — Birch, Stewart, Kolasch & Birch, LLP

(57) ABSTRACT

A flux-cored wire according to an aspect of the present invention includes: a steel sheath; and a flux filling the inside of the steel sheath, in which the flux contains 0.11% or more in total of a fluoride in terms of F-equivalent value, 4.30% to 7.50% of a Ti oxide in terms of $TiO_2$ equivalent, 0.30% to 2.40% in total of an oxide in terms of mass %, and 0% to 0.60% in total of a carbonate in terms of mass %, the amount of a Ca oxide in terms of CaO is less than 0.20% in terms of mass %, the amount of $CaF_2$ is less than 0.50%, a chemical composition of the flux-cored wire is within a predetermined range, a Z value is 2.00% or less, a V value is 5.0 to 27.0, and Ceq is 0.30% to 1.00% or less.

12 Claims, 6 Drawing Sheets

(51) Int. Cl.
  *B23K 9/16*  (2006.01)
  *B23K 9/24*  (2006.01)
  *B23K 35/30*  (2006.01)
  *B23K 35/362*  (2006.01)
  *C22C 38/00*  (2006.01)
  *C22C 38/02*  (2006.01)
  *C22C 38/06*  (2006.01)
  *C22C 38/42*  (2006.01)
  *C22C 38/44*  (2006.01)
  *C22C 38/46*  (2006.01)
  *C22C 38/48*  (2006.01)
  *C22C 38/50*  (2006.01)
  *C22C 38/54*  (2006.01)
  *C22C 38/58*  (2006.01)

(52) U.S. Cl.
  CPC ........ *B23K 35/3073* (2013.01); *B23K 35/362* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01)

(58) Field of Classification Search
  CPC ... B23K 35/362; C22C 38/002; C22C 38/005; C22C 38/02; C22C 38/06; C22C 38/42; C22C 38/44; C22C 38/46; C22C 38/48; C22C 38/50; C22C 38/54; C22C 38/58
  See application file for complete search history.

(56) References Cited

U.S. PATENT DOCUMENTS

| | | | | |
|---|---|---|---|---|
| 2015/0117937 A1* | 4/2015 | Nakamura | .............. | C22C 38/12 403/272 |
| 2015/0314397 A1* | 11/2015 | Jeong | ...................... | C22C 38/50 403/272 |
| 2016/0279742 A1* | 9/2016 | Lee | ................... | B23K 35/3073 |
| 2017/0274482 A1* | 9/2017 | Han | ....................... | B23K 35/30 |

FOREIGN PATENT DOCUMENTS

| | | | |
|---|---|---|---|
| JP | 1-271098 | A | 10/1989 |
| JP | 4-81295 | A | 3/1992 |
| JP | 4-224094 | A | 8/1992 |
| JP | 6-155079 | A | 6/1994 |
| JP | 8-257785 | A | 10/1996 |
| JP | 2002-331384 | A | 11/2002 |
| JP | 2005-319508 | A | 11/2005 |
| JP | 2006-289404 | A | 10/2006 |
| JP | 2007-90376 | A | 4/2007 |
| JP | 2008-149341 | A | 7/2008 |
| JP | 2010-274304 | A | 12/2010 |
| JP | 2011-125904 | A | 6/2011 |
| JP | 2011-255385 | A | 12/2011 |
| JP | 2012-228704 | A | 11/2012 |
| JP | 2013-18012 | A | 1/2013 |
| JP | 2013-151001 | A | 8/2013 |
| JP | 2013-184204 | A | 9/2013 |
| JP | 2013-226577 | A | 11/2013 |
| JP | 2013-252551 | A | 12/2013 |
| JP | 2014-14833 | A | 1/2014 |
| JP | 2014-79807 | A | 5/2014 |
| JP | 2015-217393 | A | 12/2015 |
| JP | 2016-55311 | A | 4/2016 |
| JP | 2016-83677 | A | 5/2016 |
| WO | WO 2011/074689 | A1 | 6/2011 |
| WO | WO 2013/168670 | A1 | 11/2013 |
| WO | WO-2014119082 | A1 * | 8/2014 ......... B23K 35/3066 |
| WO | WO 2015/068443 | A1 | 5/2015 |

OTHER PUBLICATIONS

"Method of U-groove weld cracking test", JIS Z 3157: 1993, total of 12 pages.

"Method of y-groove weld cracking test", JIS Z 3158: 2016, total of 25 pages.

"Methods of tension and impact tests for deposited metal", JIS Z 3111: 2005, total of 37 pages.

International Search Report for PCT/JP2016/083082 (PCT/ISA/210) dated Feb. 7, 2017.

Written Opinion of the International Searching Authority for PCT/JP2016/083082 (PCT/ISA/237) dated Feb. 7, 2017.

\* cited by examiner

FLUX-CORED WIRE, MANUFACTURING METHOD OF WELDED JOINT, AND WELDED JOINT

TECHNICAL FIELD OF THE INVENTION

The present invention relates to a flux-cored wire, a manufacturing method of a welded joint, and a welded joint. In particular, the present invention relates to a flux-cored wire for gas shielded arc welding, by which a weld metal having high strength and high toughness is obtained, all-position welding can be performed, the amount of spatter generated during a welding operation can be reduced even when a shielding gas is a gas that easily generates spatter, such as 100% $CO_2$ gas, and a preheating operation for preventing cold-cracking is made unnecessary or the preheating operation can be significantly reduced, a manufacturing method of a gas shielded arc welded joint using the flux-cored wire, and a welded joint obtained by the manufacturing method of the welded joint.

RELATED ART

A flux-cored wire for gas shielded welding is a welding material (filler metal) that enables a highly efficient manufacturing method of a welded joint and is widely used in the industry. A flux-cored wire having $TiO_2$ (rutile) as a primary slag forming agent (hereinafter, sometimes referred to as rutile-based FCW) is a representative wire.

Welding using the rutile-based FCW causes excellent weldability, and it is possible to suppress dripping of molten metal in welding performed at a high current value. Therefore, the rutile-based FCW has features that enable welding to be easily performed at a high current value in various welding positions such as a downhand position and a vertical position. However, since this wire contains a large amount of $TiO_2$, in a case where welding is performed using this wire, the basicity of slag is low. Therefore, in welding using the rutile-based FCW, there are problems that the amount of oxygen in a weld metal is likely to increase, and it becomes difficult to secure the toughness of the weld of high strength steel. The weld metal is a metal formed by solidification of parent material and filler metal melted during welding.

In order to solve these problems, various rutile-based flux-cored wires have been developed.

For example, Patent Document 1 discloses a flux-cored wire in which the ratio between $TiO_2$ and MgO in the flux is controlled within a predetermined range. With the flux-cored wire of Patent Document 1, the oxygen concentration in deposited metal is reduced, so that the amount of inclusions (oxides) in the deposited metal can be reduced. As a result, the toughness of the weld metal can be improved. The deposited metal is a metal transferred to the weld from the filler metal of the flux-cored wire or the like during welding.

Patent Document 2 discloses a flux-cored wire for high tensile strength steel gas shielded arc welding, including $TiO_2$, $SiO_2$, $ZrO_2$, $Al_2O_3$, and a fluorine compound, in which the amount of hydrogen is limited to 15 ppm or less. With the flux-cored wire of Patent Document 2, it is possible to perform highly efficient welding in all positions and to obtain a weld metal having good cold-cracking resistance properties and toughness. Cold-cracking is cracking that occurs, after a decrease in the temperature of a weld to near room temperature after welding, in the weld.

Patent Document 3 discloses a flux-cored wire for gas shielded welding, including a particulate titanium oxide raw material, in which the ratio between a Si metal and a Si oxide, the sum of the amount of Al and the amount of Mg, the sum of the amount of a Na compound and the amount of a K compound, the amount of a F compound, a flux filling rate, and the total amount of Al and Si contained in the titanium oxide raw material are controlled within predetermined ranges, and an oxide is present on the surface of the titanium oxide raw material. According to Patent Document 3, the flux-cored wire capable of providing good welding workability during welding performed by using a high current and forming a good bead shape during vertical upward welding is provided.

Patent Document 4 discloses a flux-cored wire for gas shielded arc welding, including a metal fluoride, a neutral oxide or a basic oxide, one or two selected from the group consisting of Al and Mg, a deoxidizing agent, and a caking material, in which the amounts of C, Si, and Mn are within predetermined ranges. According to Patent Document 4, the flux-cored wire which has excellent welding workability and enables a weld metal having good low temperature toughness to be obtained is provided.

Patent Document 5 discloses a manufacturing method of a gas shielded arc welded joint in which a welding current condition is within a predetermined range by using a flux-cored wire in which the flux contains a metal fluoride containing $CaF_2$ and a metal oxide, the ratio between the amount of the metal fluoride and the amount of the metal oxide is within a predetermined range, the amount of Fe powder in the flux is limited to a predetermined amount of less, and furthermore, the Ceq of the alloy component is within a predetermined range. According to Patent Document 5, the manufacturing method of a gas shielded arc welded joint in which the occurrence of cracking due to a reduction in ductility is suppressed during welding of ultrahigh-tension steel having a tensile strength of 950 MPa or more, and a weld metal having excellent fracture elongation can thus be obtained is provided.

Patent Document 6 discloses a manufacturing method of a welded joint using a flux-cored wire for gas shielded arc welding, in which a flux contains one or two or more of $CaF_2$, $BaF_2$, $SrF_2$, and $MgF_2$, one or two or more of a Ti oxide, a Si oxide, a Mg oxide, and an Al oxide, one or two or more of $CaCO_3$, $BaCO_3$, $SrCO_3$, and $MgCO_3$, and iron powder, and the ratio of the amount of $CaF_2$ to the total amount of the fluoride, the ratio of the total amount of the fluorides to the total amount of the oxide, and Ceq are controlled within predetermined ranges. According to Patent Document 6, the manufacturing method of a welded joint in which cracking due to a reduction in ductility is suppressed during welding of ultrahigh-tension steel of 950 MPa or more, and a weld having high strength, high toughness, and excellent elongation can be obtained is provided.

Patent Document 7 discloses a metal-based flux-cored wire for gas shielded arc welding, including a compound of one or more selected from the group consisting of an oxide containing one or more alkali metals, a fluoride, and a carbonate, in which a specific surface area is controlled within a predetermined range. According to Patent Document 7, the flux-cored wire which has excellent weld penetration and enables a weld metal to have good mechanical properties and welding workability is provided.

Patent Document 8 discloses a flux-cored wire for gas shielded arc welding, including $TiO_2$, an alkali metal fluoride, and PTFE, in which the ratio between the amount of the alkali metal fluoride and the amount of the PTFE is controlled within a predetermined range, and the amount of an alkaline earth metal fluoride is limited to a predetermined amount of less. According to Patent Document 8, the flux-cored wire which prevents diffusible hydrogen from entering a weld during arc welding and exhibits excellent moisture absorption resistance and good welding workability is provided.

Patent Document 9 discloses a flux-cored wire for gas shielded arc welding for anti-weathering steel, including a Ti oxide, a Si oxide, an Al oxide, a Na compound, a K compound, and a metal fluoride, in which the apparent density and the average grain size of the Al oxide is controlled within a predetermined range. According to Patent Document 9, the flux-cored wire which has good welding workability in all-position welding during welding of anti-weathering steel, and enables a weld metal having excellent strength and toughness to be obtained is provided.

Patent Document 10 discloses a flux-cored wire for gas shielded arc welding, including a metal fluoride and $TiO_2$, in which the amount of Mg and the amount of Al are controlled within ranges specified by a predetermined formula. According to Patent Document 10, the flux-cored wire which has good welding workability and enables a weld having excellent low temperature toughness to be obtained is provided.

Patent Document 11 discloses a flux-cored wire for arc welding, including 75 wt % or more of a metal powder, in which one or both of a steel sheath and the flux contain V. According to Patent Document 11, the flux-cored wire in which preheating is unnecessary or preheating can be significantly omitted during welding of high tensile strength steel in a grade of 490 MPa or more, and a weld having excellent cracking resistance can be obtained is provided.

Patent Document 12 discloses a flux-cored wire for high tensile strength steel gas shielded arc welding, including $TiO_2$, $SiO_2$, $ZrO_2$, $Al_2O_3$, and a fluoride, in which the amounts thereof are controlled within ranges defined by a predetermined formula, and the amount of hydrogen is limited to a predetermined amount or less. According to Patent Document 12, the flux-cored wire which has excellent welding workability and enables a weld metal having excellent mechanical properties to be obtained is provided.

Patent Document 13 discloses a flux-cored wire for high tensile strength steel gas shielded arc welding, including $TiO_2$, $SiO_2$, $ZrO_2$, $Al_2O_3$, and a fluorine compound, in which the amounts thereof are controlled within predetermined ranges, and the amount of hydrogen is limited to a predetermined amount or less. According to Patent Document 13, the flux-cored wire which enables highly efficient welding in all positions to be performed and enables a weld metal having low temperature toughness and cracking resistance to be obtained is provided.

Patent Document 14 discloses a flux-cored wire for carbon dioxide gas shielded arc welding for high tensile strength steel, including $TiO_2$, $SiO_2$, $ZrO_2$, $Al_2O_3$, and a fluorine compound, in which the amounts thereof are controlled within predetermined ranges, and the amount of hydrogen is limited to a predetermined amount of less. According to Patent Document 13, the flux-cored wire which can be used for welding of high tensile strength steel having a proof stress of 690 MPa or more during which 100% carbon dioxide gas is used as a shielding gas, and has excellent welding workability, and enables a weld metal having excellent mechanical performance to be obtained is provided.

However, the flux-cored wire according to the prior art includes problems described below regarding the properties of the weld metal and/or welding workability.

In the flux-cored wire disclosed in Patent Document 1, the cold-cracking resistance properties of the weld metal is not considered. During welding using the rutile-based FCW, the amount of oxygen in the weld metal and the amount of diffusible hydrogen increase. Therefore, when high strength steel is welded using a general rutile-based FCW, preheating is necessary to suppress cold-cracking. However, in Patent Document 1, no method for suppressing cold-cracking has been examined at all, so that preheating cannot be made unnecessary or reduced during welding of a high strength steel plate using the flux-cored wire of Patent Document 1.

In Patent Document 2, there has been an attempt to suppress cold-cracking by limiting the amount of hydrogen in the wire. However, hydrogen also intrudes into the weld metal from the atmosphere surrounding the weld metal during welding. Therefore, even if the amount of hydrogen in the wire is small, the amount of diffusible hydrogen in the weld metal cannot be sufficiently reduced. In welding using the wire of Patent Document 2, there may be cases where cold-cracking cannot be suppressed unless preheating is sufficiently performed. In Patent Document 2, the amount of oxygen and the amount of diffusible hydrogen in the weld metal are not examined. In Patent Document 2, an example in which a preheating temperature is 50° C. or lower and cold-cracking does not occur is not described.

In Patent Document 3, the evaluation result of the amount of diffusible hydrogen in the weld metal is not disclosed. Furthermore, in Patent Document 3, the kind of a fluoride is not disclosed at all. From Patent Document 3, no technical guideline for a flux-cored wire which enables all-position welding and can sufficiently reduce the amount of diffusible hydrogen in the weld metal is obtained.

It is difficult to perform all-position welding using the flux-cored wire of Patent Document 4. This is because the flux-cored wire of Patent Document 4 does not include any unit that enables all-position welding, for example, $TiO_2$.

In Patent Documents 5 and 6, no method for reducing the amount of diffusible hydrogen in the weld metal is disclosed. Therefore, with the flux-cored wires of Patent Documents 5 and 6, preheating cannot be made unnecessary or reduced by improving the cold-cracking properties of the weld metal. In addition, it is difficult to perform all-position welding using the flux-cored wires of Patent Documents 5 and 6. Furthermore, the flux-cored wires of Patent Documents 5 and 6 contain a large amount of $CaF_2$, which causes an increase in the amount of spatter. Therefore, in a case where the wires of Patent Documents 5 and 6 are applied to welding using 100% $CO_2$ gas as a shielding gas, an excessive amount of spatter is generated and thus welding workability is deteriorated.

The wire disclosed in Patent Document 7 is a so-called metal-based wire in which the primary component of the flux is metal powder and no slag forming agent is contained. Welding slag has an effect of removing impurities from molten pool, an effect of improving the appearance of the weld metal by adjusting the bead width and bead wave, and an effect or preventing oxidation and nitriding of the weld metal immediately after solidification. With the wire disclosed in Patent Document 7, these effects of the welding slag are not obtained.

In the flux-cored wire disclosed in Patent Document 8, according to an example of Patent Document 8, the amount of diffusible hydrogen in the weld metal cannot be reduced to less than 1.9 ml/100 g. The inventors have found that preheating cannot be made unnecessary or reduced by improving the cold-cracking properties of the weld metal if the amount of diffusible hydrogen in the weld metal is not reduced to 1.0 ml/100 g or less. In addition, in Patent Document 8, no method for reducing the amount of spatter is disclosed. The example of Patent Document 8 relates to welding using a shielding gas consisting of Ar and 20% $CO_2$. Therefore, in a case where the wire of Patent Document 8 is applied to welding using 100% $CO_2$ gas, an excessive amount of spatter is generated, and thus welding workability is deteriorated.

In Patent Document 9, no method for improving the cold-cracking properties of the weld metal is disclosed. In particular, the amount of the fluoride disclosed in Patent Document 9 is insufficient for reducing the amount of diffusible hydrogen in the weld metal. Furthermore, as a result of examination by the inventors, it was found that the amount of Al disclosed in Patent Document 9 is insufficient for performing 100% $CO_2$ welding. Therefore, with the flux-cored wire of Patent Document 9, preheating cannot be made unnecessary or reduced, and the weldability of welding using 100% $CO_2$ gas as a shielding gas is deteriorated.

The flux-cored wires disclosed in Patent Documents 10 and 11 do not contain a necessary amount of $TiO_2$ for sufficiently improving weldability. In addition, in Patent Documents 10 and 11, it is postulated that a large amount of $CaF_2$ is added to the flux-cored wire. Therefore, the flux-cored wire disclosed in Patent Document 10 generates a large amount of spatter during welding using 100% $CO_2$ gas as a shielding gas.

As a result of examination by the inventors, it was found that the amount of Al disclosed in Patent Document 12 is insufficient for stabilizing arc and reducing the amount of spatter. The flux-cored wire described in Patent Document 12 exhibits good weldability during welding using a mixed gas of Ar and $CO_2$ as the shielding gas but is not considered to be applied to welding using 100% $CO_2$ as the shielding gas. Furthermore, the flux-cored wire disclosed in Patent Document 12 does not have features for sufficiently decreasing a cold-cracking parameter. Therefore, with the flux-cored wire of Patent Document 12, preheating cannot be made unnecessary or reduced.

The flux-cored wires disclosed in Patent Documents 13 and 14 are intended to reduce the amount of diffusible hydrogen in a weld obtained by welding a steel plate having a tensile strength in a grade of 690 MPa. However, the amount of diffusible hydrogen in the weld cannot be reduced to a degree that preheating can be made unnecessary or reduced in welding of a steel plate having a higher tensile strength. The inventors conducted an experiment using the flux-cored wires disclosed in Patent Documents 13 and 14, and found that cold-cracking cannot be prevented without preheating in welding of a steel plate having a tensile strength of more than 690 MPa. In addition, it was found by the examination by the inventors that with the flux-cored wires disclosed in Patent Documents 13 and 14, deoxidation of the weld metal could not be sufficiently performed, and furthermore, vertical weldability was poor.

PRIOR ART DOCUMENT

Patent Document

[Patent Document 1] Japanese Unexamined Patent Application, First Publication No. 2008-149341
[Patent Document 2] Japanese Unexamined Patent Application, First Publication No. 2013-18012
[Patent Document 3] Japanese Unexamined Patent Application, First Publication No. 2013-184204
[Patent Document 4] Japanese Unexamined Patent Application, First Publication No. H1-271098
[Patent Document 5] Japanese Unexamined Patent Application, First Publication No. 2014-14833
[Patent Document 6] Japanese Unexamined Patent Application, First Publication No. 2014-79807
[Patent Document 7] Japanese Unexamined Patent Application, First Publication No. 2002-331384
[Patent Document 8] Japanese Unexamined Patent Application, First Publication No. 2007-90376
[Patent Document 9] Japanese Unexamined Patent Application, First Publication No. 2013-151001
[Patent Document 10] Japanese Unexamined Patent Application, First Publication No. H6-155079
[Patent Document 11] Japanese Unexamined Patent Application, First Publication No. H8-257785
[Patent Document 12] Japanese Unexamined Patent Application, First Publication No. 2013-18012
[Patent Document 13] Japanese Unexamined Patent Application, First Publication No. 2010-274304
[Patent Document 14] Japanese Unexamined Patent Application, First Publication No. 2011-255385

DISCLOSURE OF THE INVENTION

Problems to be Solved by the Invention

In view of the problems of the related art, an object of the present invention is to provide a flux-cored wire by which a weld having high strength, high toughness, excellent cold-cracking resistance properties, and a good bead shape is obtained, the amount of spatter generated during welding can be significantly reduced, and the viscosity of molten metal can be increased during welding.

In addition, another object of the present invention is to provide a manufacturing method of a welded joint which can be applied to all-position welding, make a preheating operation for preventing cracking in weld metal unnecessary or significantly reduced, and significantly reduce the amount of spatter generated.

Furthermore, still another object of the present invention is to provide a welded joint having a weld having high strength, high toughness, and a good bead shape.

Means for Solving the Problem

The gist of the present invention is as follows.
(1) According to an aspect of the present invention, a flux-cored wire includes: a steel sheath; and a flux filling the inside of the steel sheath, in which the flux contains a fluoride including 0.11% or more in total of one or two or more selected from the group consisting of $CaF_2$, $MgF_2$, LiF, NaF, $K_2ZrF_6$, $BaF_2$, $K_2SiF_6$, and $Na_3AlF_6$ in terms of F-equivalent value with respect to a total mass of the flux-cored wire, 4.30% to 7.50% of a Ti oxide ($TiO_2$-equivalent value) in terms of mass % with respect to the total mass of the flux-cored wire, 0.30% to 2.40% in total of an oxide including one or two or more selected from the group consisting of a Fe oxide, a Ba oxide, a Na oxide, a Si oxide, a Zr oxide, a Mg oxide, an Al oxide, a Mn oxide, and a K oxide in terms of mass % with respect to the total mass of the flux-cored wire, excluding the Ti oxide and a Ca oxide, and 0% to 0.60% in total of a carbonate including one or two or more selected from the group consisting of $MgCO_3$, $Na_2CO_3$, $LiCO_3$, $CaCO_3$, $K_2CO_3$, $BaCO_3$, $FeCO_3$, and $MnCO_3$ in terms of mass % with respect to the total mass of the flux-cored wire, an amount of the Ca oxide (Cao-equivalent value) is 0% or more and less than 0.20% in terms of mass % with respect to the total mass of the flux-cored wire, an amount of the $CaF_2$ is 0% or more and less than 0.50% in terms of mass % with respect to the total mass of the flux-cored wire, a chemical composition of the flux-cored wire excluding the fluoride, the oxide, the Ti oxide, the Ca oxide, and the carbonate includes, in terms of mass % with respect to the total mass of the flux-cored wire, C: 0.003% to 0.120%, Si: 0.45% to 1.00%, Mn: 1.00% to 3.50%, P: 0.030% or less, S: 0.020% or less, Al: 0.08% to 0.70%, Cu: 0% to 0.05%, Ni: 0% to 0.60%, Cr: 0% to 1.00%, Mo: 0% to 1.00%, Nb: 0% to 0.20%, V: 0% to 0.200%, Ti: 0% to 0.10%, B: 0% to 0.020%, Bi: 0% to 0.030%, Mg: 0% to 0.90%, Ca: 0% to 0.50%, REM: 0% to 0.0100%, and a remainder consisting of Fe and impurities, a Z value calculated by Formula 1 is 2.00% or less, a V value calculated by Formula 2 is 5.0 to 27.0, and Ceq calculated by Formula 3 is 0.30% to 1.00% or less, $$Z=0.7\times([Na_3AlF_6]+[NaF]+[MgF_2])+0.8\times([K_2SiF_6]+[K_2ZrF_6])+0.9\times([LiF]+[BaF_2])+3.5\times([CaF_2]): \quad \text{Formula 1}$$

$$V=([TiO_2]+1.2\times[SiO_2]+1.4\times[Al_2O_3]+1.5\times[ZrO_2])/(F)^{1/2}: \quad \text{Formula 2}$$

$$Ceq=[C]+[Si]/24+[Mn]/6+[Ni]/40+[Cr]/5+[Mo]/4+[V]/14: \quad \text{Formula 3}$$

where each chemical formula enclosed by square brackets in Formula 1 indicates an amount of a compound corresponding to the chemical formula in terms of mass % with respect to the total mass of the flux-cored wire, each chemical formula enclosed by square brackets in Formula 2 indicates an amount of a compound corresponding to the chemical formula in terms of equivalent values of the compounds with respect to the total mass of the flux-cored wire, F in Formula 2 indicates the total amount of the fluoride in terms of F-equivalent value, and each element symbol enclosed by square brackets in Formula 3 indicates the amount of an element corresponding to the element symbol contained in the chemical composition of the flux-cored wire excluding the fluoride, the oxide, the Ti oxide, the Ca oxide, and the carbonate in terms of mass % with respect to the total mass of the flux-cored wire.

(2) In the flux-cored wire according to (1), the total amount of the fluoride in terms of the F-equivalent value with respect to the total mass of the flux-cored wire may be 0.50% or more.

(3) In the flux-cored wire according to (1) or (2), the Z value may be 1.80% or less.

(4) In the flux-cored wire according to any one of (1) to (3), a total amount of the $Na_3AlF_6$, the NaF, and the $MgF_2$ in terms of mass % with respect to the total mass of the flux-cored wire to a total amount of the fluoride in terms of mass % with respect to the total mass of the flux-cored wire may be 0.50% or more.

(5) In the flux-cored wire according to any one of (1) to (4), the steel sheath may have a seamless shape.

(6) In the flux-cored wire according to any one of (1) to (4), the steel sheath may have a slit-like gap.

(7) The flux-cored wire according to any one of (1) to (6) may further include a perfluoropolyether oil applied to a surface of the flux-cored wire.

(8) In the flux-cored wire according to any one of (1) to (7), an amount of hydrogen in the flux-cored wire may be 12 ppm or less with respect to the total mass of the flux-cored wire.

(9) In the flux-cored wire according to any one of (1) to (8), the amount of the $CaF_2$ in terms of mass % with respect to the total mass of the flux-cored wire may be less than 0.20%.

(10) According to another aspect of the present invention, a manufacturing method of a welded joint includes: performing gas shielded arc welding on a steel using the flux-cored wire according to any one of (1) to (9).

(11) In the manufacturing method of a welded joint according to (10), the steel may be one selected from the group consisting of a steel plate having a plate thickness of 12 mm or less and a Pcm of 0.36% or less, a steel plate having a plate thickness of more than 12 mm and 25 mm or less and a Pcm of 0.33% or less, a steel plate having a plate thickness of more than 25 mm and 40 mm or less and a Pcm of 0.31% or less, and a steel plate having a plate thickness of more than 40 mm and 100 mm or less and a Pcm of 0.29% or less, and when the gas shielded arc welding is performed on the steel, in a case where a temperature of the steel is lower than 5° C., the steel is preheated to cause the temperature of the steel to be 5° C. or higher, and in a case where the temperature of the steel is 5° C. or higher, the gas shielded arc welding is performed without preheating the steel, here, Pcm is calculated by Formula 4, $$Pcm=[C]+[Si]/30+[Mn]/20+[Cu]/20+[Ni]/60+[Cr]/20+[Mo]/15+[V]/10+5\times[13]; \quad \text{Formula 4}$$

provided that each element symbol to which square brackets are added indicates an amount of an element corresponding to the element symbol contained in the steel in terms of unit mass %.

(12) According to still another aspect of the present invention, a welded joint may be obtained by the manufacturing method of a welded joint according to (10) or (11).

(13) According to still another aspect of the present invention, a flux-cored wire includes: a steel sheath; and a flux filling the inside of the steel sheath, in which an amount of diffusible hydrogen in a weld metal obtained by performing DC gas shielded arc welding using the flux-cored wire under a condition specified in JIS Z 3118 is 1.0 ml/100 g or less, and a weight of spatter generated per welding time when DC gas shielded arc welding is performed using the flux-cored wire under a condition that a wire side is positive, a welding position is downhand, a current value is 270 A, a voltage value is 30 V, a welding rate is 30 cm/min, a kind of a shielding gas is 100% $CO_2$ gas, and a flow rate of the shielding gas is 25 L/min is 3.5 g/min or less.

(14) According to still another aspect of the present invention, a flux-cored wire includes: a steel sheath; and a flux filling the inside of the steel sheath, in which the flux-cored wire contains, in terms of mass % with respect to a total mass of the flux-cored wire, Al: 0.08% to 0.70%, Ni: 0% to 0.60%, a $TiO_2$ equivalent value of a Ti oxide: 4.30% to 7.50%, an amount of diffusible hydrogen in a weld metal obtained by performing DC gas shielded arc welding using the flux-cored wire under a condition specified in JIS Z 3118 is 1.0 ml/100 g or less, and a weight of spatter generated per welding time when DC gas shielded arc welding is performed using the flux-cored wire under a condition that a wire side is positive, a welding position is downhand, a current value is 270 A, a voltage value is 30 V, a welding rate is 30 cm/min, a kind of a shielding gas is 100% $CO_2$ gas, and a flow rate of the shielding gas is 25 L/min is 3.5 g/min or less.

Effects of the Invention

With the flux-cored wire according to the present invention, a weld having high strength, high toughness, excellent cold-cracking resistance properties, and a good bead shape can be obtained, the amount of spatter generated during welding can be significantly reduced, and the viscosity of molten metal during welding can be increased. The flux-cored wire according to the present invention can obtain the above-described effects even in combination with any kind of shielding gas, and has a significant advantage over flux-cored wires in the related art particularly in a case of being provided for welding using 100% $CO_2$ gas, which is likely to generate spatter, as the shielding gas.

The manufacturing method of a welded joint according to the present invention can be applied to all-position welding, make a preheating operation for preventing cracking in the weld metal unnecessary or significantly reduced, and significantly reduce the amount of spatter generated.

The welded joint according to the present invention has a weld having high strength, high toughness, and a good bead shape.

EMBODIMENTS OF THE INVENTION

Figure 1:
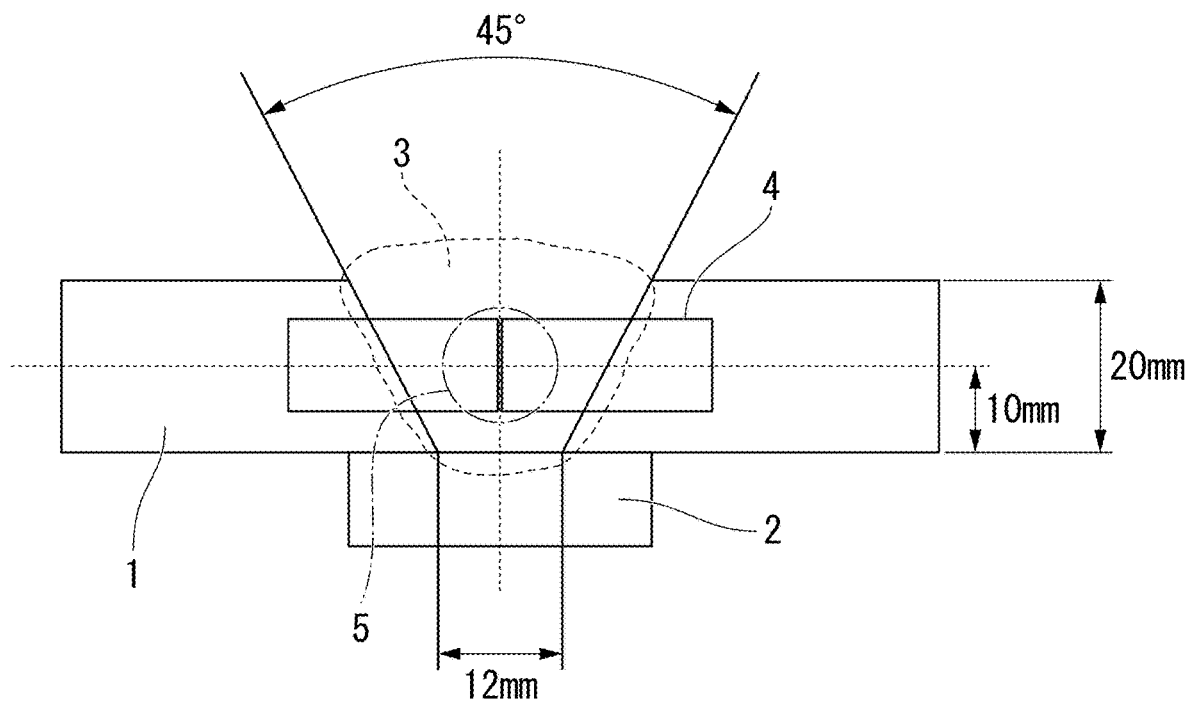
FIG. 1 is a view showing sampling positions of a tension test piece and a Charpy test piece in examples.

A flux-cored wire according to an embodiment includes a steel sheath and a flux filling the inside of the steel sheath. Hereinafter, the reasons for limiting the requirements of configuring the flux-cored wire according to this embodiment will be described.

First, elements contained in the flux of the flux-cored wire according to this embodiment will be described.

The flux of the flux-cored wire according to this embodiment includes fluorides, a Ti oxide, and oxides (excluding a Ti oxide and a Ca oxide), and preferably further includes carbonates. In addition, the flux of the flux-cored wire according to this embodiment may further include a Ca oxide and iron powder, but the Ca oxide and the iron powder are unnecessary for solving the problems of the flux-cored wire according to this embodiment. Hereinafter, these elements will be described in detail. In the following description, "%" means "mass % with respect to the total mass of the flux-cored wire" unless otherwise specified.

($TiO_2$ Equivalent Value of Ti Oxide: 4.30% to 7.50% in Terms of mass % with Respect to Total Mass of Flux-Cored Wire)

The flux of the flux-cored wire according to this embodiment includes 4.30% to 7.50% of the Ti oxide in terms of $TiO_2$-equivalent value. The Ti oxide mainly acts as a slag forming agent. In a case where vertical upward welding is performed using a flux-cored wire in which the amount of a Ti oxide is less than 4.3%, it is not possible to secure a sufficient amount of slag for supporting molten metal so as not to drip, and vertical weldability cannot be secured. Therefore, the lower limit of the amount of the Ti oxide is 4.30%. The lower limit of the amount of the Ti oxide is more suitably 4.50%. In order to improve the vertical weldability, the lower limit of the amount of the Ti oxide may be 4.70%, 4.90%, 5.00%, 5.20%, or 5.30%.

On the other hand, the Ti oxide in an amount more than 7.50% causes an excessive increase in the amount of slag, and thus increases defects due to slag incorporation. Therefore, the upper limit of the amount of the Ti oxide is 7.50%. The upper limit of the amount of the Ti oxide is more suitably 7.00%. As necessary, the upper limit of the amount of the Ti oxide may be 6.70%, 6.40%, 6.20%, 6.00%, 5.90%, or 5.80%.

The $TiO_2$-equivalent value (mass %) of the Ti oxide means the amount of $TiO_2$ when assuming that all oxides of Ti are $TiO_2$. The same applies to equivalent values of CaO oxide and the like described below.

(Sum of F-Equivalent Values of Fluorides with Respect to Total Mass of Flux-Cored Wire: 0.11% or More)

The flux of the flux-cored wire according to this embodiment includes 0.11% or more of the fluorides in total in terms of F-equivalent value with respect to the total mass of the flux-cored wire. The F-equivalent value with respect to the total mass of the flux-cored wire denotes the amount of fluorine (F) contained in the fluorides in terms of mass % with respect to the total mass of the flux-cored wire, and can be obtained by Formula A.

$$0.487 \times CaF_2 + 0.610 \times MgF_2 + 0.732 \times LiF + 0.452 \times NaF + 0.402 \times K_2ZrF_6 + 0.217 \times BaF_2 + 0.517 \times K_2SiF_6 + 0.543 \times Na_3AlF_6$$ 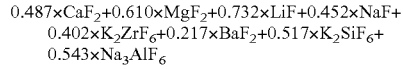

Formula A

The chemical formula of the fluoride in Formula A represents the mass % of the fluoride corresponding to the chemical formula with respect to the total mass of the flux-cored wire. The coefficient of the chemical formula of each fluoride was calculated from the formula weight of the fluoride. For example, the coefficient 0.487 of the F-equivalent value of $CaF_2$ is a value obtained by dividing a value which is twice the atomic weight of fluorine, 19.00, by the formula weight of $CaF_2$, 78.08. In a case where the flux-cored wire contains a fluoride which is not contained in Formula A, Formula A may be modified based on the chemical formula of the fluoride.

The fluorides in the flux have a function of reducing the amount of diffusible hydrogen in weld metal thereby significantly improving the cold-cracking resistance properties of the weld metal. The reason for this is not clear, but it is presumed that F in the fluorides and hydrogen (H) are combined during welding to form hydrogen fluoride (HF), and this HF is released out of the weld metal. However, in a case where the sum of the F-equivalent values of the amounts of the fluorides in the flux is less than 0.11%, the amount of diffusible hydrogen in the weld metal is insufficiently reduced, so that the cold-cracking resistance properties of the weld metal becomes insufficient. Therefore, the flux of the flux-cored wire according to this embodiment is required to contain 0.11% or more of the fluorides in terms of F-equivalent value. In order to further reduce the amount of diffusible hydrogen in the weld metal, the lower limit of the total amount of the fluorides in terms of F-equivalent value may be 0.14%, 0.21%, 0.30%, 0.35%, 0.40%, 0.45%, 0.50%, 0.60%, 0.65%, 0.70%, or 0.80%, or 0.90%. On the other hand, in a case where a reduction in the amount of spatter generated is prior to a reduction in the amount of diffusible hydrogen, the upper limit of the sum of the F-equivalent values may be 2.00%, 1.70%, 1.50%, 1.30%, 1.10%, 1.00% 0.90%, 0.80%, 0.70%, 0.60%, 0.50%, or 0.40%.

The above findings were obtained by an experiment described below. The inventors conducted DC gas shielded arc welding using various flux-cored wires having different F-equivalent values under the following conditions, and investigated the relationship between the F-equivalent value and the amount of diffusible hydrogen in the weld metal.

Wire polarity: positive
Wire diameter: 1.2 mm
Welding position: downhand
Kind of welding gas: 100% $CO_2$
Welding gas flow rate: 25 L/min
Welding current: 270 A
Voltage: 30 V
Welding rate: 35 cm/min
Temperature of welding environment: 20° C.
Humidity of welding environment: 60%

Figure 3:
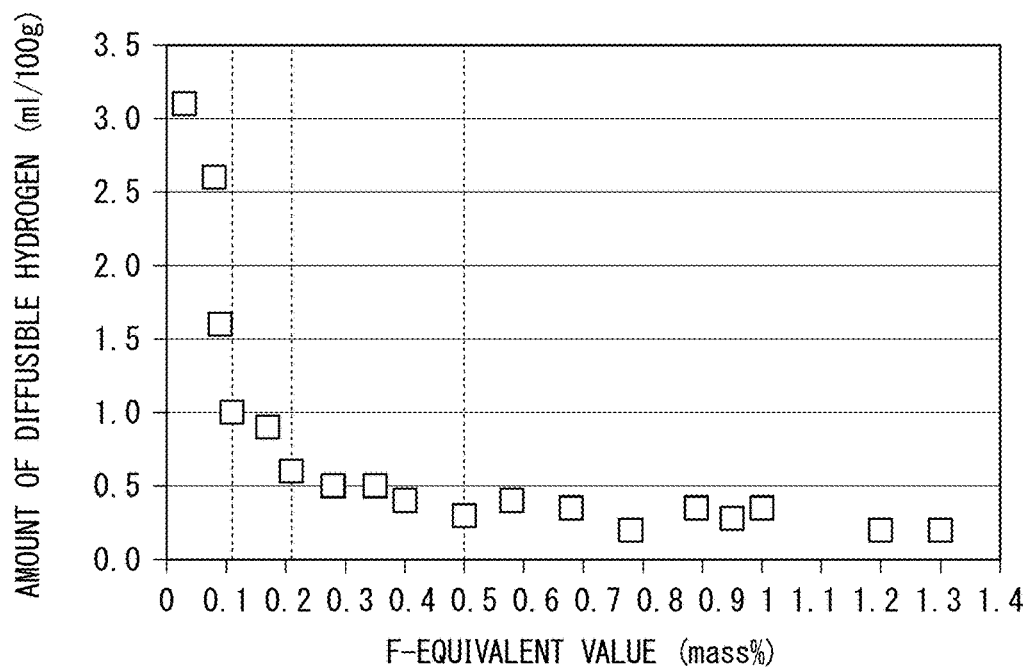
FIG. 3 is a graph showing the relationship between the F-equivalent value of fluorides of a flux-cored wire and the amount of diffusible hydrogen in a weld metal.

A graph showing the relationship between the F-equivalent value of the flux-cored wire and the amount of diffusible hydrogen in a weld obtained by using the flux-cored wire, which was plotted by the inventors based on the result of the experiment, is shown in FIG. 3. The graph of FIG. 3 shows that the F-equivalent value needs to be 0.11% or more in order to cause the amount of diffusible hydrogen to be 1.0 ml/100 g or less, the F-equivalent value is preferably 0.21% or more in order to cause the amount of diffusible hydrogen to be stably less than 0.6 ml/100 g, and the F-equivalent value is preferably 0.50% or more in order to cause the amount of diffusible hydrogen to be stably less than 0.4 ml/100 g.

In a case where the amount of the fluorides is excessive, the amount of spatter during welding increases. However, in the flux-cored wire according to this embodiment, there is no need to determine the upper limit of the F-equivalent values of the fluorides. This is because the inventors found that the upper limit of the amount of the fluorides has to be limited by using a spatter generation index Z, which will be described later. The F-equivalent values of the fluorides are preferably large as long as the spatter generation index Z is within the range described below.

(Kinds of Fluorides: Including One or Two or More Selected from Group Consisting of: $CaF_2$, $MgF_2$, $LiF$, $NaF$, $K_2ZrF_6$, $BaF_2$, $K_2SiF_6$, and $Na_3AlF_6$)

The fluorides of the flux-cored wire according to this embodiment include one or two or more selected from the group consisting of $CaF_2$, $MgF_2$, $LiF$, $NaF$, $K_2ZrF_6$, $BaF_2$, $K_2SiF_6$, and $Na_3AlF_6$, but may also include other fluorides. Ca, Mg, Li, Na, K, Zr, Ba, Si, and Al generated by the ionization of these fluorides act as deoxidizing elements that are combined with oxygen and thus reduce the amount of oxygen in the weld metal. The lower limit of the amount of these various fluorides is not particularly limited as long as the sum of the F-equivalent values is 0.11% or more.

The kinds and composition of the fluorides are not limited as long as the F-equivalent values of the fluorides described above, the spatter generation index Z, which will be described later, and the amount of $CaF_2$, which will be described later, are within specified ranges. However, $K_2ZrF_6$ and $K_2SiF_6$ also function as an arc stabilizer, it is preferable that the fluorides of the flux-cored wire according to this embodiment contain $K_2ZrF_6$ and $K_2SiF_6$. In addition, from the viewpoint of arc stability, it is preferable that a plurality of kinds of fluorides are contained in the flux to cause the amount of a single kind of fluoride to be 2.0% or less. Furthermore, the fluorides contain any one of $Na_3AlF_6$, $NaF$, and $MgF_2$, which are less likely to increase the spatter generation index Z, which will be described later. Therefore, the sum of the amounts of $Na_3AlF_6$, $NaF$, and $MgF_2$ in terms of mass % with respect to the total mass of the flux-cored wire, with respect to the sum of the amounts of the fluorides in terms of mass % with respect to the total mass of the flux-cored wire is more preferably 0.50 (50%) or more. Furthermore, the proportion of the sum of the amounts of $Na_3AlF_6$, $NaF$, and $MgF_2$ in the sum of the amounts of all the fluorides in terms of mass % with respect to the total mass of the flux-cored wire may be 60% or more, 80% or more, 90% or more, or 100%. In addition, the proportion of the sum of the amounts of $Na_3AlF_6$ and $NaF$ in the sum of the amounts of all the fluorides in terms of mass % with respect to the total mass of the flux-cored wire may be 50% or more, 60% or more, 80% or more, 90% or more, or 100%.

(Spatter Generation Index Z (Z Value): 2.00% or Less)

In a case where the amount of the fluorides is too large, the amount of spatter generated during welding becomes excessive, resulting in deterioration of weldability. The inventors examined a method of increasing the F-equivalent value as much as possible and reducing the amount of spatter to within an allowable range. As a result, the inventors found that $Na_3AlF_6$, $NaF$, and $MgF_2$ are less likely to increase the amount of spatter compared to the other kinds of fluorides, and $CaF_2$ is more likely to increase the amount of spatter compared to the other kinds of fluorides. In addition, as a result of further examinations, the inventors found that there is a good correlation between the spatter generation index Z (Z value) calculated by Formula B and the amount of spatter.

$$Z=0.7\times([Na_3AlF_6]+[NaF]+[MgF_2])+0.8\times([K_2SiF_6]+[K_2ZrF_6])+0.9\times([LiF]+[BaF_2])+3.5\times([CaF_2]) \quad \text{Formula B}$$

Figure 4:
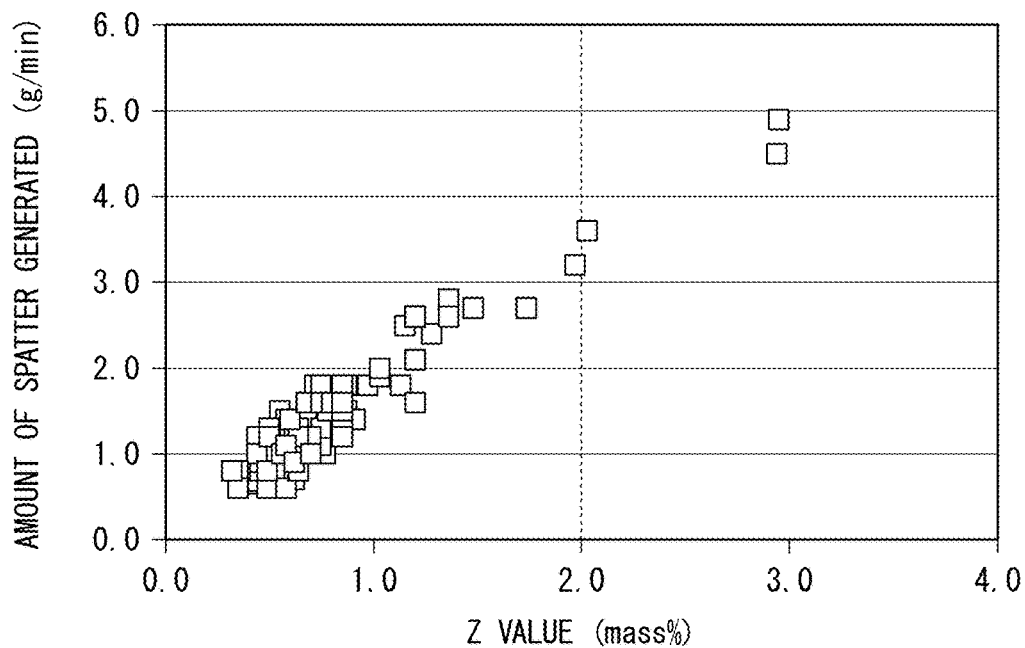
FIG. 4 is a graph showing the relationship between the spatter generation index (Z value) of the flux-cored wire and the amount of spatter during welding.

In formula B, each chemical formula enclosed by square brackets indicates the amount of the fluoride corresponding to the chemical formula in terms of mass % with respect to the total mass of the flux-cored wire. The inventors investigated the relationship between the amounts of various fluorides added and the amount of spatter generated, and obtained a regression equation that clarifies the influence of each of the fluorides on the amount of spatter generated. FIG. 4 is a graph showing the relationship between the Z value of the flux-cored wire and the amount of spatter. The horizontal axis of the graph of FIG. 4 represents the Z value obtained by Formula B, and the vertical axis represents the amount of spatter generated. The amount of spatter generated is a value obtained by dividing the weight of spatter generated when DC gas shielded arc welding is performed under the condition that the welding position is downhand, the wire diameter is 1.2 mm, the electrode polarity is positive, the current value is 270 A, the voltage value is 30 V, the rate is 30 cm/min, the shielding gas is 100% $CO_2$, and the shielding gas flow rate is 25 L/min, by the welding time.

It can be seen from the graph of FIG. 4 that there is a good correlation between the Z value and the amount of spatter, and the Z value needs to be 2.0% or less in order to cause the amount of spatter to 3.5 g/min or less. Therefore, in the flux-cored wire according to this embodiment, the amount of the fluorides needs to be controlled to cause the Z value to be 2.00% or less. A preferable upper limit of the Z value is 1.80%. In a case where it is desired to further reduce the amount of spatter generated, the upper limit of the Z value may be 1.60%, 1.40%, 1.20%, 1.00%, 0.90%, 0.80%, or 0.70%.

There is no need to limit the lower limit of the Z value. However, since the sum of the F-equivalent values needs to be 0.11% or more, the minimum value of the Z value that can satisfy the regulation of the F-equivalent values may be used as the lower limit of the Z value. That is, the Z value is minimized in a case where the sum of the F-equivalent values is the minimum value (0.11%) and the fluorides contain only $MgF_2$, and the minimum necessary amount of $MgF_2$ in this case is 0.180% (=0.110/0.610). Therefore, there is no possibility that the lower limit of the Z value falls below 0.126% (=0.180×0.700). Therefore, the lower limit of the Z value may be 0.126%. In a case where it is desired to further reduce the amount of diffusible hydrogen, the lower limit of the Z value may be 0.20%, 0.40%, 0.60%, 0.80%, 1.00%, 1.20%, 1.40%, 1.60%, or 1.80%. The Z value is preferably as small as possible as long as the sum of the F-equivalent values of the fluorides is equal to or more than the lower limit described above.

(Amount of $CaF_2$: Less than 0.50% in Terms of Mass % with Respect to Total Mass of Flux-Cored Wire)

$CaF_2$ is a fluoride which is more likely to increase particularly the amount of spatter. The inventors found that even if the Z value of the fluorides is less than 2.00%, 0.50% or more of $CaF_2$ causes generation of a large amount of spatter and deterioration of welding workability. Therefore, in the flux-cored wire according to this embodiment, the amount of $CaF_2$ needs to be less than 0.50%. The preferable upper limit of the amount of $CaF_2$ is 0.20%. As necessary, the amount of $CaF_2$ may be less than 0.10%, less than 0.06%, less than 0.04%, or less than 0.02%. Furthermore, since the flux-cored wire according to this embodiment does not require $CaF_2$, the lower limit of the amount of $CaF_2$ is 0%.

(Total Amount of Oxides Excluding Ti Oxide and Ca Oxide: 0.30 to 2.40% in Terms of Mass % with Respect to Total Mass of Flux-Cored Wire)

(Kinds of Oxides Excluding Ti Oxide and Ca Oxide: Including One or Two or More Selected from Group Consisting of Fe Oxide, Ba Oxide, Na Oxide, Si Oxide, Zr Oxide, Mg Oxide, Al Oxide, Mn Oxide, and K Oxide)

The flux of the flux-cored wire according to this embodiment includes the Ti oxide as described above. Furthermore, as will be described later, in the flux of the flux-cored wire according to this embodiment, the amount of the Ca oxide (CaO equivalent value) is 0.10% or less. The flux of the flux-cored wire according to this embodiment includes 0.30% to 2.40% in total of oxides excluding the Ti oxide and the Ca oxide as a slag forming agent in terms of mass % with respect to the total mass of the flux-cored wire in a case of being calculated in terms of equivalent values respectively corresponding to oxides mentioned below. The oxides excluding the Ti oxide and the Ca oxide include one or two or more selected from the group consisting of a Fe oxide (in terms of FeO), a Ba oxide (in terms of BaO), a Na oxide (in terms of $Na_2O$), a Si oxide (in terms of $SiO_2$), a Zr oxide (in terms of $ZrO_2$), a Mg oxide (in terms of MgO), an Al oxide (in terms of $Al_2O_3$), a Mn oxide (in terms of $MnO_2$), and a K oxide (in terms of $K_2O$), but may also include other oxides. That is, the flux of the flux-cored wire according to this embodiment includes 0.30% to 2.40% in total of one or two or more selected from the group consisting of the Fe oxide, the Ba oxide, the Na oxide, the Si oxide, the Zr oxide, the Mg oxide, the Al oxide, the Mn oxide, and the K oxide in terms of equivalent values of FeO, BaO, $Na_2O$, $SiO_2$, $ZrO_2$, MgO, $Al_2O_3$, $MnO_2$, and $K_2O$ with respect to the total mass of the flux-cored wire, and includes oxides excluding the Ti oxide and the Ca oxide. Hereinafter, there may be cases where "the oxides excluding the Ti oxide and the Ca oxide" may be referred to as "oxides".

The oxides have an effect of favorably maintaining a weld bead shape and an effect of improving the vertical weldability. The Na oxide, the K oxide, the Mg oxide, the Fe oxide, and the like have an effect of stabilizing the arc. In order to obtain the effect, the amount of the oxides needs to be 0.30% or more. In order to further exert these effects, the lower limit of the amount of the oxides may be 0.50%, 0.70%, 0.90%, 1.00%, 1.10%, or 1.20%. However, when the amount of the oxides exceeds 2.40%, there is concern that slag may be incorporated. The preferable upper limit of the oxides is 2.20%, 2.00%, 1.90%, 1.80%, 1.70%, 1.60%, or 1.50%.

There is no need to define the amounts of the oxides for each kind of oxide, but for example, a composition including an Si oxide: 0.08% to 0.95%, a Zr oxide: 0.80% or less, and an Al oxide: 0.50% or less is suitable. In this embodiment, the amount of the oxides is regarded as an amount to which oxides contained in a binder and the like used for assembly of the flux are added in addition to the total amount of the Fe oxide, the Ba oxide, the Na oxide, the Si oxide, the Zr oxide, the Mg oxide, the Al oxide, the Mn oxide, and the K oxide.

(V Value: 5.0 to 27.0)

In the flux wire according to this embodiment, a V value calculated by Formula C needs to be 5.0 to 27.0.

$$V=([TiO_2]+1.2\times[SiO_2]+1.4\times[Al_2O_3]+1.5\times[ZrO_2])/(F)^{1/2} \quad \text{Formula C}$$

In formula C, the compound corresponding to each chemical formula enclosed by square brackets indicates the amount of the compound in terms of mass % with respect to the total mass of the flux-cored wire, and indicates the amount in terms of equivalent values corresponding to the oxides as described above. F represents the total amount of the fluorides in terms of F-equivalent value. The inventors found that the relationship between the amount of the Ti oxide ($TiO_2$-equivalent value), the Si oxide ($SiO_2$-equivalent value), the Al oxide ($Al_2O_3$-equivalent value), and the Zr oxide ($ZrO_2$-equivalent value) among the oxides and the amount of the fluorides needs to be within an appropriate range. The inventors found that in a case of performing welding using a flux-cored wire in which the amount of the Ti oxide, the Si oxide, the Al oxide, and the Zr oxide is too large with respect to the amount of the fluorides, that is, the V value exceeds 27.0, the amount of oxide-based slag having a high melting point increases, and slag incorporation is likely to occur. On the other hand, the inventors found that in a case of performing welding using a flux-cored wire in which the amount of the Ti oxide, the Si oxide, the Al oxide, and the Zr oxide is too small with respect to the amount of the fluorides, that is, the V value is less than 5.0, the arc force is increased by the fluorides, the molten metal is compressed, and deterioration of the bead shape and deterioration of vertical weldability are likely to occur. Therefore, the V value of the flux-cored wire according to this embodiment is 5.0 to 27.0. The lower limit of the V value is preferably 7.0, 9.0, 10.0, 11.0, or 12.0. The upper limit value of the V value is preferably 25.0, 22.5, 20.0, 18.0, 16.0, or 15.0.

(Sum of Amounts of Carbonates: 0 to 0.60% in Terms of Mass % with Respect to Total Mass of Flux-Cored Wire)

The flux of the flux-cored wire according to this embodiment does not need to contain carbonates. Therefore, the lower limit of the amount of the carbonates in the flux-cored wire according to this embodiment is 0%. However, carbonates are ionized by the arc and generate $CO_2$ gas. The $CO_2$ gas reduces the partial pressure of hydrogen in the welding atmosphere and reduces the amount of diffusible hydrogen in the weld metal. In order to obtain this effect, the flux of the flux-cored wire according to this embodiment may contain the carbonates.

On the other hand, there is concern that the carbonates in an amount more than 0.60% may cause dripping of weld beads and deteriorate welding workability. Therefore, the upper limit of the carbonates contained in the flux of the flux-cored wire according to this embodiment needs to be 0.60%. A preferable upper limit of the amount of the carbonates is 0.40%. As necessary, the upper limit of the amount of the carbonates may be 0.30%, 0.20%, 0.10%, 0.06%, or 0.03%.

(Kinds of Carbonates: Including One or Two or More Selected from Group Consisting of: $MgCO_3$, $Na_2CO_3$, $LiCO_3$, $CaCO_3$, $K_2CO_3$, $BaCO_3$, $FeCO_3$, and $MnCO_3$)

The kinds of the carbonates contained in the flux of the flux-cored wire according to this embodiment include one or two or more selected from the group consisting of $MgCO_3$, $Na_2CO_3$, $LiCO_3$, $CaCO_3$, $K_2CO_3$, $BaCO_3$, $FeCO_3$, and $MnCO_3$, but are not limited thereto. The kinds and composition of the carbonates are not limited as long as the amount of the carbonates is within the above-described range.

(Ca Oxide: Less than 0.20% of CaO Equivalent in Terms of Mass % with Respect to Total Mass of Flux-Cored Wire)

There may be cases where the Ca oxide is contained in the flux of the flux-cored wire according to this embodiment. However, in the flux-cored wire according to this embodiment, the amount of the Ca oxide in the flux needs to be less than 0.20% (CaO equivalent). There may be cases where the Ca oxide increases spatter and deteriorates weldability. A preferable upper limit of the amount of the Ca oxide is 0.15%, 0.10%, 0.05%, 0.02%, or 0.01%. Since it is preferable that no Ca oxide is contained, the lower limit of the amount of the Ca oxide is 0%. Since there is concern that the Ca oxide may be contained in the material of the flux as an impurity in an amount of 0.20% or more, there is a need to select a material that does not contain a Ca oxide in manufacturing of the flux-cored wire according to this embodiment.

As described above, the flux of the flux-cored wire according to this embodiment may contain iron powder. There may be cases where the iron powder is contained as necessary in order to adjust the filling rate of the flux of the flux-cored wire, or improve the deposition efficiency. However, there may be cases where oxygen adhered to the surface layer of the iron powder increases the amount of oxygen in the weld metal and decreases the toughness. Therefore, in the flux-cored wire according to this embodiment, it is preferable that the amount of the iron powder is less than 10.0%. As necessary, the upper limit of the amount of the iron powder may be limited to 8.0%, 6.0%, 4.0%, 2.0%, or 1.0%. Since iron powder is unnecessary to solve the problem of the flux-cored wire according to this embodiment, the lower limit value of the amount of the iron powder is 0% in flux-cored wire according to this embodiment.

The flux according to this embodiment may contain elements other than the elements mentioned above. For example, alloying elements for controlling the chemical composition of the deposited metal and the Ceq may be contained in the flux in a state other than fluorides, oxides, or carbonates (for example, in a state of metal powder or alloy powder). The metal powder and the alloy powder are melted in the same manner as the steel sheath during welding and thus affect the weld metal. Therefore, the alloying elements described later exhibit the same effects even if the alloying elements are contained in the flux-cored wire in the form of the metal powder or the alloy powder or contained in the flux-cored wire in the form of the steel sheath.

Next, the chemical composition of the flux-cored wire according to this embodiment excluding the fluorides, the oxides (excluding the Ti oxide and the Ca oxide), the Ti oxide, the Ca oxide, and the carbonates will be described. In the following description, "%" means "mass % with respect to the total mass of the flux-cored wire" unless otherwise specified. The chemical composition described below may be contained in the steel sheath, may be contained in the flux as described above, or may be contained in the coating on the outer surface of the steel sheath. In the following description, there may be cases where "the chemical composition of the flux-cored wire excluding the fluorides, the oxides, the Ti oxide, the Ca oxide, and the carbonates" is simply referred to as the "chemical composition of the flux-cored wire".

(C: 0.003% to 0.120%)

C is an important element for securing the proof stress and tensile strength of the weld metal by solid solution strengthening. When the amount of C in the chemical composition of the flux-cored wire is less than 0.003%, the proof stress and tensile strength of the weld metal can be secured. On the other hand, when the amount of C in the chemical composition of the flux-cored wire exceeds 0.120%, the amount of C in the weld metal becomes excessive, the proof stress and tensile strength of the weld metal excessively increase, and the toughness of the weld metal decreases. In order to stably secure all of the toughness, proof stress, and tensile strength of the weld metal, the lower limit of the amount of C in the chemical composition of the flux-cored wire is preferably 0.030%, and the upper limit of the amount of C in the chemical composition of the flux-cored wire is preferably 0.080%. As necessary, the lower limit of the amount of C may be 0.010%, 0.020%, 0.030%, 0.040%, 0.050%, or 0.060%. Similarly, the upper limit of the amount of C may be 0.100%, 0.090%, 0.080%, or 0.070%.

(Si: 0.45% to 1.00%)

Figure 5:
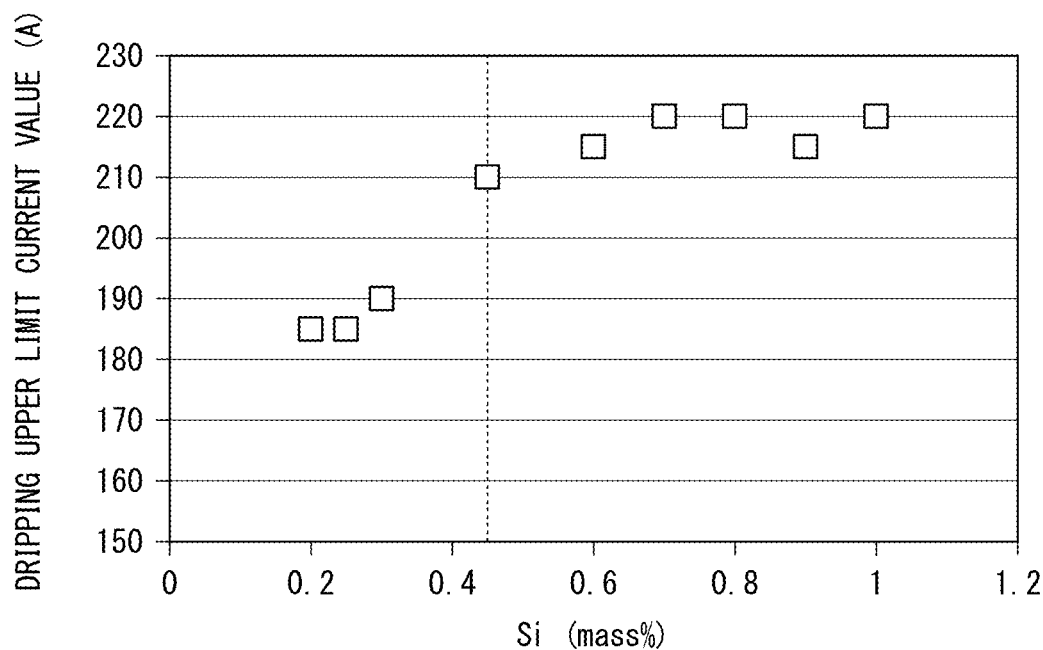
FIG. 5 is a graph showing the relationship between the amount of Si contained in the flux-cored wire as an alloying element and a dripping upper limit current value during welding.
Figure 8A:
FIG. 8A is a photograph of a weld metal where dripping did not occur during overhead welding.
Figure 8B:
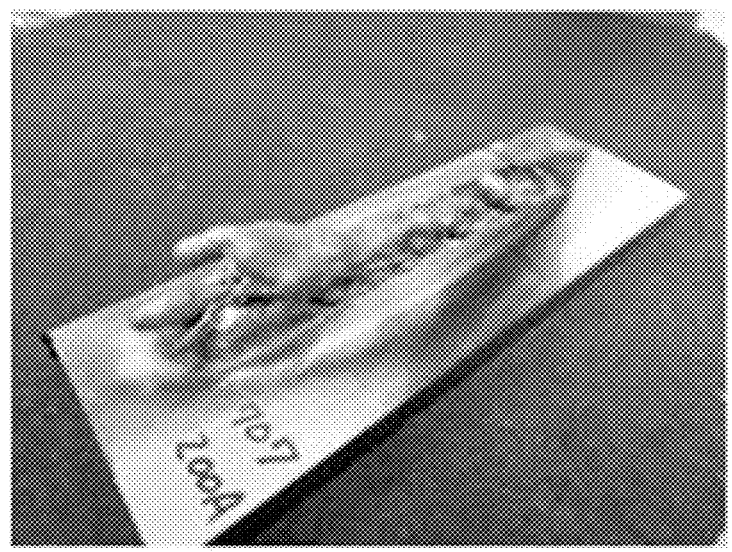
FIG. 8B is a photograph of a weld metal where dripping had occurred during overhead welding.

Si is a deoxidizing element and has a function of enhancing the cleanliness of the weld metal by reducing the amount of oxygen in the weld metal. Furthermore, the inventors found that when welding is performed using 100% $CO_2$ gas, Si contained in the flux-cored wire increases the viscosity of the weld metal, prevents dripping of the weld metal during vertical welding, and improves vertical weldability. The inventors investigated dripping upper limit current values of various flux-cored wires having different amounts of Si. The dripping upper limit current value is the absolute maximum value of a current value at which dripping of the weld metal does not occur in a case where upward welding is performed using an arc welding robot and the flux-cored wire while increasing a welding current value at a pitch of 5 A under the welding conditions of a welding rate of 15 cm/min, a weaving width of 14 mm, a weaving frequency of 0.8 Hz, and a welding gas kind of 100% $CO_2$. FIG. 8A is a photograph of a weld where dripping did not occur, and FIG. 8B is a photograph of a weld where dripping had occurred. A graph representing the relationship between the amount of Si in the flux-cored wire and the dripping upper limit current value, created by the inventors, is shown in FIG. 5. It is shown in the graph of FIG. 5 that in a case where the amount of Si in the flux-cored wire becomes 0.45% or more, the dripping upper limit current value significantly increases. Based on the above findings, the inventors defined the lower limit of the amount of Si in the flux-cored wire according to this embodiment as 0.45%. However, in a case where the amount of Si in the chemical composition of the flux-cored wire exceeds 1.00%, Si deteriorate the toughness of the weld metal. In order to stably secure the toughness of the weld metal, the upper limit of the amount of Si in the chemical composition of the flux-cored wire may be 0.90%, 0.80%, 0.70%, or 0.60%. As necessary, the lower limit of the amount of Si may be 0.50%, 0.55%, 0.60%, or 0.65%.

(Mn: 1.00% to 3.50%)

Mn is an element necessary for securing the hardenability of the weld metal and increasing the strength of the weld metal. In order to reliably obtain the effect, the amount of Mn in the chemical composition of the flux-cored wire needs to be 1.00% or more. In order to further increase the strength of the weld metal, the lower limit of the amount of Mn in the chemical composition of the flux-cored wire may be 1.40%, 1.60%, 1.80%, 2.00%, or 2.10%. On the other hand, in a case where the amount of Mn in the chemical composition of the flux-cored wire exceeds 3.50%, the intergranular embrittlement parameter of the weld metal increases, and the toughness of the weld metal deteriorates. Therefore, the upper limit of the amount of Mn is 3.50%. Preferably, the upper limit of the amount of Mn is 3.20%, 2.90%, 2.70%, 2.50%, or 2.30%.

(P: 0.030% or Less)

P is an impurity element and reduces the toughness of the weld metal, so that the amount of P in the flux-cored wire needs to be reduced as much as possible. Therefore, the lower limit of the amount of P in the chemical composition of the flux-cored wire is 0%. In addition, when the amount of P in the chemical composition of the flux-cored wire is 0.030% or less, the adverse effect of P on toughness can be within an acceptable range. In order to prevent the solidification cracking of the weld metal, the amount of P in the chemical composition of the flux-cored wire is more suitably 0.020% or less, 0.015% or less, or 0.010% or less.

(S: 0.020% or Less)

S is also an impurity element. When S is excessively present in the weld metal, both the toughness and ductility of the weld metal deteriorate. Therefore, the amount of Si in the flux-cored wire is preferably reduced as much as possible. Therefore, the lower limit of the amount of S in the chemical composition of the flux-cored wire is 0%. In addition, when the amount of S in the chemical composition of the flux-cored wire is 0.020% or less, the adverse effect of S on the toughness and ductility of the weld metal toughness can be within an acceptable range. The amount of S in the chemical composition of the flux-cored wire is more suitably 0.010% or less, 0.008% or less, 0.006% or less, or 0.005% or less.

(Al: 0.08% to 0.70%)

Figure 6:
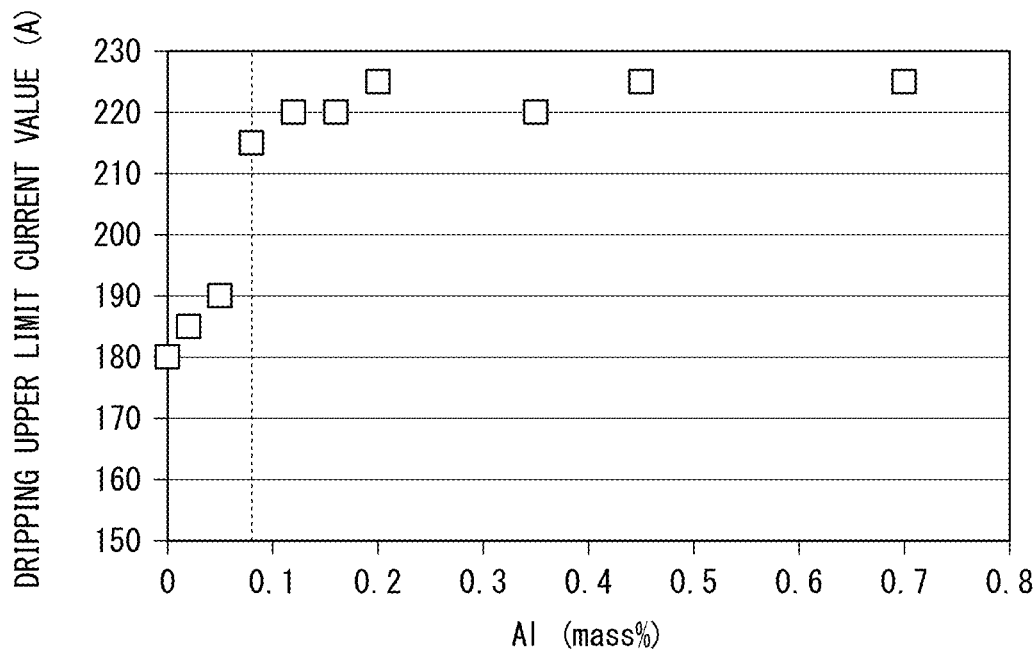
FIG. 6 is a graph showing the relationship between the amount of Al contained in the flux-cored wire as an alloying element and a dripping upper limit current value during welding.

Al is a deoxidizing element, and like the Si, has an effect of improving the cleanliness of the weld metal by reducing the amount of oxygen in the weld metal. Furthermore, the inventors conducted various examinations, and as a result, found that Al increases the viscosity of the weld metal and prevents dripping of the weld metal during vertical welding. The inventors investigated the dripping upper limit current values of various flux-cored wires having different amounts of Al. The dripping upper limit current value is the absolute maximum value of a current value at which dripping of the weld metal does not occur in a case where upward welding is performed using the arc welding robot and the flux-cored wire while increasing a welding current value at a pitch of 5 A under the welding conditions of a welding rate of 15 cm/min, a weaving width of 14 mm, a weaving frequency of 0.8 Hz, and a welding gas kind of 100% $CO_2$. FIG. 6 is a photograph of a weld where dripping did not occur, and FIG. 6 is a photograph of a weld where dripping had occurred. A graph representing the relationship between the amount of Al in the flux-cored wire and the dripping upper limit current value, created by the inventors, is shown in FIG. 6. It is shown in the graph of FIG. 6 that in a case where the amount of Al in the flux-cored wire becomes less than 0.08%, the dripping upper limit current value decreases.

The inventors found by conducting the above experiment that in a case where the flux contains the Ti oxide and the fluorides in the amounts described above, in order to improve the welding workability by improving the viscosity of the weld metal, the amount of Al in the chemical composition of the flux-cored wire needs to be 0.08% or more. When the amount of Al in the chemical composition of the flux-cored wire is less than 0.08%, the viscosity of the weld metal becomes insufficient. In particular, in vertical welding using 100% $CO_2$ gas as the shielding gas, in a case where the amount of Al in the chemical composition of the flux-cored wire is less than 0.08%, it is difficult to perform welding because of poor weldability. On the other hand, in a case where the amount of Al in the chemical composition of the flux-cored wire exceeds 0.70%, Al forms nitrides, oxides, and the like to reduce the toughness of the weld metal, and furthermore, Al also increases the amount of spatter. Therefore, the upper limit of the amount of Al in the chemical composition of the flux-cored wire is 0.70%. The upper limit of the amount of Al in the chemical composition of the flux-cored wire is preferably 0.60%, 0.50%, 0.40%, or 0.35%. The lower limit of the amount of Al content in the chemical composition of the flux-cored wire is preferably 0.10%, 0.12%, 0.16%, 0.18%, 0.20% or 0.22%.

The chemical composition of the flux-cored wire according to this embodiment may contain the following elements as necessary in addition to the above-mentioned basic elements.

(Ni: 0% to 0.60%)

Ni is not an essential element, so that the lower limit of the amount of Ni in the flux-cored wire is 0%. In addition, the inventors found that in a case where the amount of Ni in the flux-cored wire is too large, the rate of occurrence of cold-cracking in a U-groove weld cracking test of a weld obtained by using the flux-cored wire increases. The inventors conducted a U-groove weld cracking test based on JIS Z 3157 (method of U-groove weld cracking test) on a welded joint obtained by welding a wear-resistant steel plate having a Brinell hardness of 450 HB, a Pcm of 0.33, and a plate thickness of 25 mm using various flux-cored wires having different amounts of Ni under the welding conditions of 100% $CO_2$ gas (welding gas flow rate: 25 L/min), a welding current of 270 A, a welding voltage of 30 V, a welding rate 30 cm/min, a downhand welding position, and an atmosphere at a temperature of 5° C. and a humidity of 60% without preheating.

Figure 7:
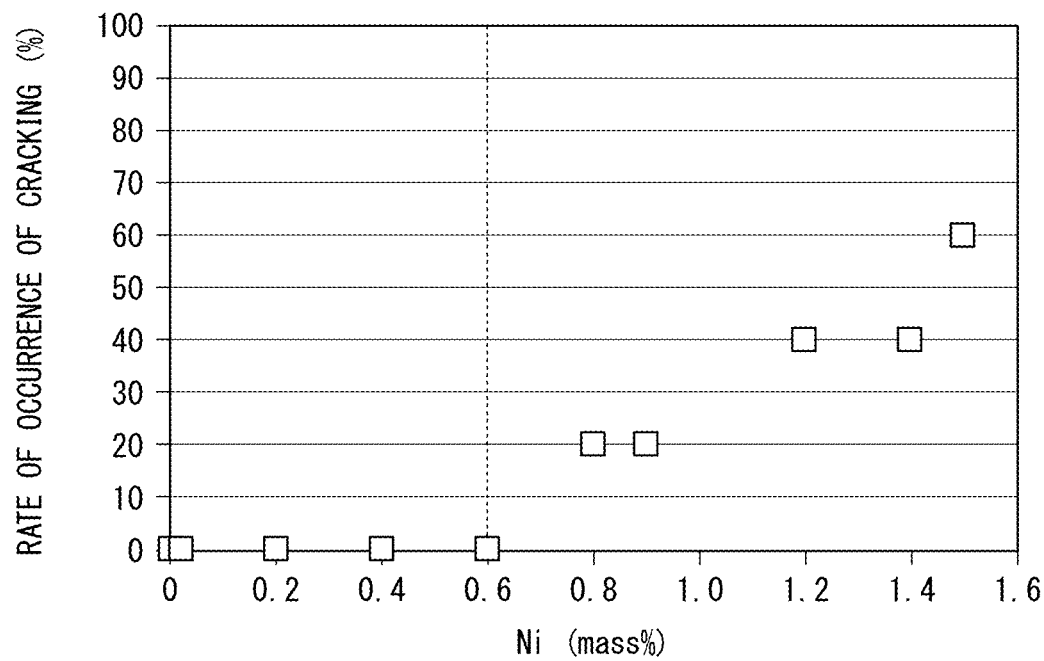
FIG. 7 is a graph showing the relationship between the amount of Ni contained in the flux-cored wire as an alloying element and the rate of occurrence of cracking in a y-groove weld cracking test of the weld metal.

A graph representing the relationship between the amount of Ni in the flux-cored wire and the rate of occurrence of cold-cracking in the U-groove weld cracking test of the weld obtained by using the flux-cored wire, created based on the examination result by the inventors, is shown in FIG. 7. In the graph of FIG. 7, it is shown that in a case where the amount of Ni in the flux-cored wire is 0.60% or less, the rate of occurrence of cracking becomes 0%. Therefore, the upper limit of the amount of Ni in the chemical composition of the flux-cored wire is 0.60%. Even in a case where a material to be welded is high strength steel having a tensile strength in a grade of 590 MPa or more, a weld metal having sufficient cold-cracking resistance properties for making preheating unnecessary or reduced can be obtained by a flux-cored wire in which the amount of Ni is 0.60% or less. The cause of an increase in the rate of occurrence of cold-cracking due to an increase in the amount of Ni is unclear. However, the inventors speculate that weld metal becomes sensitive to hydrogen due to an increase in the amount of Ni. The upper limit of the amount of Ni in the chemical composition of the flux-cored wire is preferably 0.40%, 0.20%, or 0.15%.

On the other hand, Ni enhances the strength of the weld metal by improving the hardenability. Ni is an element that further improves the toughness of the weld metal by solid solution toughening (an action of increasing toughness by solid solution). In order to obtain this effect, 0.60% or less of Ni may be contained in the flux-cored wire.

(Ti: 0% to 0.10%)

Ti is not an essential element, so that the lower limit of the amount of Ti in the chemical composition of the flux-cored wire is 0%. On the other hand, Ti is a deoxidizing element and has an effect of reducing the amount of oxygen in the weld metal. In addition, Ti contained in the chemical composition of the flux-cored wire slightly remains in the weld metal and fixes solute N, so that Ti has an effect of alleviating the adverse effect of the solute N on the toughness of the weld metal. Therefore, the chemical composition of the flux-cored wire may contain 0.01% or more of Ti. However, when the amount of Ti in the chemical composition of the flux-cored wire exceeds 0.10%, there is concern that deterioration of toughness may occur due to excessive formation of precipitate in the weld metal. In a case where Ti is contained in the chemical composition of the flux-cored wire, generally, ferrotitanium (an alloy of iron and titanium) is contained in the flux. The upper limit of the amount of Ti in the chemical composition of the flux-cored wire is preferably 0.08%, 0.06%, 0.04%, or 0.02%.

(B: 0% to 0.020%)

B is not an essential element, so that the lower limit of the amount of B in the chemical composition of the flux-cored wire is 0%. On the other hand, B bonds with solute N in the weld metal to form BN, so that B has an effect of reducing the adverse effect of the solute N on the toughness of the weld metal. B improves the hardenability of the weld metal and therefore has an effect of improving the strength of the weld metal. Therefore, the chemical composition of the flux-cored wire may contain 0.0005% or more of B. However, when the amount of B in the chemical composition of the flux-cored wire exceeds 0.020%, B in the weld metal becomes excessive and coarse B compounds such as BN and $Fe_{23}(C,B)_6$ are formed, resulting in deterioration of the toughness of the weld metal, which is not preferable. The upper limit of the amount of B in the chemical composition of the flux-cored wire is preferably 0.015%, 0.010%, 0.005%, 0.003%, or 0.001%.

(Mo: 0% to 1.00%)

Mo is not an essential element, so that the lower limit of the amount of Mo in the chemical composition of the flux-cored wire is 0%. On the other hand, Mo has an effect of improving the hardenability of the weld metal, and is thus an element effective for high-strengthening of the weld metal. In order to obtain this effect, the amount of Mo in the chemical composition of the flux-cored wire is preferably 0.01% or more. However, in a case where the amount of Mo in the chemical composition of the flux-cored wire exceeds 1.00%, the toughness of the weld metal deteriorates, so that the amount of Mo in the chemical composition of the flux-cored wire is 1.00% or less. The upper limit of the amount of Mo in the chemical composition of the flux-cored wire is preferably 0.75%, 0.50%, 0.30%, 0.10%, or 0.06%.

(Cu: 0% to 0.50%)

Cu is not an essential element, so that the lower limit of the amount of Cu in the chemical composition of the flux-cored wire is 0%. On the other hand, Cu has an effect of improving the strength and toughness of the weld metal. In order to sufficiently obtain the effect, the amount of Cu in the chemical composition of the flux-cored wire is preferably 0.01% or more. Cu may be contained in the coating of the surface of the steel sheath of the flux-cored wire and may be contained as a simple substance or an alloy in the flux. The Cu coating also has an effect of improving corrosion resistance, conductivity, and chipping wear resistance. Therefore, the amount of Cu in the chemical composition of the flux-cored wire is the total amount of Cu contained in the steel sheath and the flux and Cu contained in the coating on the wire surface. On the other hand, when the amount of Cu in the chemical composition of the flux-cored wire exceeds 0.50%, the toughness of the weld metal decreases. The upper limit of the amount of Cu in the chemical composition of the flux-cored wire is preferably 0.04%, 0.30%, or 0.20%.

(Nb: 0% to 0.20%)

Nb is not an essential element, so that the lower limit of the amount of Nb in the chemical composition of the flux-cored wire is 0%. On the other hand, Nb forms fine carbides in the weld metal, and the fine carbides cause precipitation strengthening in the weld metal, so Nb improves the tensile strength of the weld metal. In order to sufficiently obtain the effect, the amount of Nb in the chemical composition of the flux-cored wire is 0.005% or more. However, when the amount of Nb in the chemical composition of the flux-cored wire exceeds 0.20%, Nb forms coarse precipitates in the weld metal and deteriorates the toughness of the weld metal, which is not preferable. The upper limit of the amount of Nb in the chemical composition of the flux-cored wire is preferably 0.08%, 0.06%, 0.04%, or 0.02%.

(V: 0% to 0.200%)

V is not an essential element, so that the lower limit of the amount of V in the chemical composition of the flux-cored wire is 0%. On the other hand, V improves the hardenability of the weld metal, and is thus an element effective for high-strengthening of the weld metal. In order to sufficiently obtain the effect, the amount of V in the chemical composition of the flux-cored wire is preferably 0.010% or more. In a case where the amount of V in the chemical composition of the flux-cored wire exceeds 0.200%, the amount of V carbides precipitated in the weld metal becomes excessive, and the weld metal is excessively hardened, resulting in deterioration of the toughness of the weld metal. The upper limit of the amount of V in the chemical composition of the flux-cored wire is preferably 0.160%, 0.120%, 0.080%, 0.040%, or 0.020%.

(Cr: 0% to 1.00%)

Cr is not an essential element, so that the lower limit of the amount of Cr in the chemical composition of the flux-cored wire is 0%. On the other hand, Cr improves the hardenability of the weld metal, and is thus an element effective for improving the strength of the weld metal. In order to sufficiently obtain the effect, the amount of Cr in the chemical composition of the flux-cored wire is preferably 0.10% or more. In a case where the amount of Cr in the chemical composition of the flux-cored wire exceeds 1.00%, the weld metal is excessively hardened, resulting in deterioration of the toughness of the weld metal. The upper limit of the amount of Cr in the chemical composition of the flux-cored wire is preferably 0.70%, 0.40%, 0.20% or 0.10%.

(Mg: 0% to 0.90%)

Mg is not an essential element, so that the lower limit of the amount of Mg in the chemical composition of the flux-cored wire is 0%. On the other hand, Mg is a deoxidizing agent, and is an element that reduces the amount of oxygen in the weld metal and thus improves the toughness of the weld metal. In order to sufficiently obtain the effect, the amount of Mg in the chemical composition of the flux-cored wire is preferably 0.10% or more. In a case where the amount of Mg in the chemical composition of the flux-cored wire exceeds 0.90%, Mg and oxygen vigorously react with each other in the arc, and the amount of spatter and fumes generated increases. A preferable lower limit of the amount of Mg in the chemical composition of the flux-cored wire is 0.10%, 0.15%, 0.20%, 0.25%, or 0.30%. A preferable upper limit of the amount of Mg in the chemical composition of the flux-cored wire is 0.70%, 0.55%, 0.45%, or 0.35%.

(Bi: 0% to 0.030%)

Bi is not an essential element, so that the lower limit of the amount of Bi in the chemical composition of the flux-cored wire is 0%. On the other hand, Bi is an element that improves the peelability of the slag. In order to sufficiently obtain the effect, the amount of Bi in the chemical composition of the flux-cored wire is preferably 0.005% or more, 0.010% or more, or 0.012% or more. On the other hand, in a case where the amount of Bi in the chemical composition of the flux-cored wire exceeds 0.030%, solidification cracking is likely to occur in the weld metal, so that the upper limit of the amount of Bi in the chemical composition of the flux-cored wire is 0.030%. The upper limit of the amount of Bi in the chemical composition of the flux-cored wire is preferably 0.025%, 0.020%, 0.017%, or 0.015%.

(Ca: 0% to 0.50%)

(REM: 0% to 0.0100%)

Ca and REM are not essential elements, so that the lower limit of the amount of Ca and the amount of REM in the chemical composition of the flux-cored wire is 0%. On the other hand, both Ca and REM have functions of changing the structure of sulfides in the weld metal, refining the sizes of the sulfides and oxides, and thus improving the ductility and toughness of the weld metal. Therefore, the amount of Ca in the chemical composition of the flux-cored wire may be 0.002% or more, and the amount of REM in the chemical composition of the flux-cored wire may be 0.0002% or more. On the other hand, in a case where the amount of Ca and the amount of REM in the chemical composition of the flux-cored wire are excessive, the amount of spatter increases, and the weldability is impaired. Therefore, the upper limit of the amount of Ca in the chemical composition of the flux-cored wire is 0.50%, and the upper limit of the amount of REM in the chemical composition of the flux-cored wire is 0.0100%.

(Remainder: Fe and Impurities)

The reason for limiting the chemical composition of the flux-cored wire of this embodiment excluding the fluorides, the oxides, the Ti oxide, the Ca oxide, and the carbonates is described above, but the remainder consists of Fe and impurities. Examples of Fe of the remainder include Fe contained in the steel sheath and Fe in the alloy powder added to the flux. The impurities are elements derived from raw materials when the flux-cored wire is industrially manufactured, or elements incorporated due to various factors of the manufacturing process, and mean elements that are allowed within a range not adversely affecting the flux-cored wire according to this embodiment.

(Ceq: 0.30% to 1.00%)

Ceq is an index (carbon equivalent) indicating hardenability calculated by Formula D $$Ceq=(C)+(Si)/24+(Mn)/6+(Ni)/40+(Cr)/5+(Mo)/4+(V)/14 \quad \text{Formula D}$$

In Formula D, each element symbol enclosed by parenthesis indicates the amount of the element corresponding to the element symbol contained in the chemical composition of the flux-cored wire excluding the fluorides, the oxides, the Ti oxide, the Ca oxide, and the carbonates in terms of mass % with respect to the total mass of the flux-cored wire. That is, the Ceq (the Ceq of the flux-cored wire) calculated from the chemical composition of the flux-cored wire of this embodiment is calculated without considering the amounts of the elements contained in the flux-cored wire in the state of the fluorides, the oxides, the Ti oxide, the Ca oxide, or the carbonates. The elements contained in the flux-cored wire in the state of the fluorides, the oxides, the Ti oxide, the Ca oxide, or the carbonates are discharged to the outside of the weld metal as slag during welding and thus do not affect the hardenability of the weld metal.

The Ceq of the flux-cored wire is equal to the Ceq of the deposited metal (the metal transferred from the filler metal such as the flux-cored wire or the like to the weld during welding) and also affects the hardenability of the weld metal (the metal melted and solidified during welding, including a region where the material to be welded and the filler metal are mixed). In a case where the Ceq is high, the weld metal is hardened, and thus the tensile strength of the weld metal is improved. On the other hand, the toughness of the weld metal decreases. In the flux-cored wire according to this embodiment, the chemical composition excluding the fluorides, the oxides, the Ti oxide, the Ca oxide, and the carbonates needs to be controlled so that the Ceq is 0.30% to 1.00%. In a case where the Ceq is less than 0.30%, the tensile strength of the weld metal is insufficient. In order to increase the tensile strength of the weld metal, the lower limit of the Ceq may be 0.35%, 0.38%, 0.41%, 0.44% or 0.46%. On the other hand, in a case where the Ceq exceeds 1.00%, the toughness of the weld metal is insufficient. Therefore, the upper limit of the Ceq is 1.00%. In order to increase the toughness of the weld metal, the upper limit of the Ceq may be 0.80%, 0.60%, 0.55%, 0.52% or 0.49%.

Next, the shape of the flux-cored wire according to this embodiment will be described.

Figure 2A:
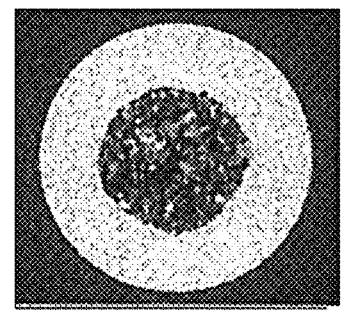
FIG. 2A is a cross-sectional photograph of a flux-cored wire made by butt welding edge faces.
Figure 2B:
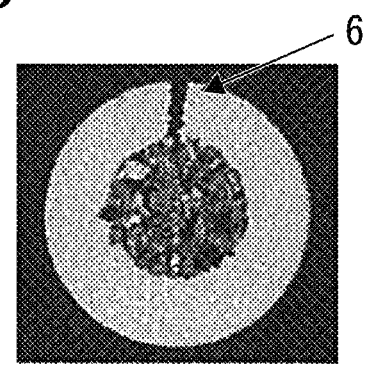
FIG. 2B is a cross-sectional photograph of a flux-cored wire made by butting edge faces.
Figure 2C:
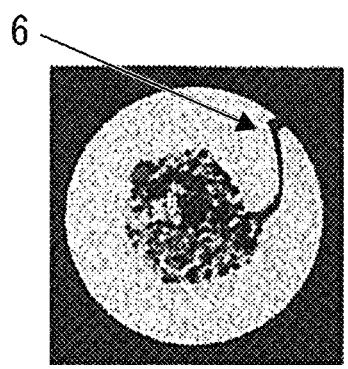
FIG. 2C is a cross-sectional photograph of a flux-cored wire made by crimping edge faces.

Normally, the flux-cored wire is classified into a wire (sometimes referred to as a seamless wire) in which the seam of the steel sheath is welded and thus the wire has a shape (seamless shape) with no slit-like gap as shown in FIG. 2A, and a wire in which the seam of the steel sheath is not welded and thus the wire has a shape including a slit-like gap 6 as shown in FIG. 2B or 2C.

The flux-cored wire according to this embodiment can adopt any shape. However, in order to suppress the occurrence of cold-cracking in the weld metal, it is preferable that there is no slit-like gap in the steel sheath. H (hydrogen) infiltrating into the weld during welding diffuses into the weld metal and the material to be welded, accumulates in a stress concentration portion, and causes the occurrence of cold-cracking. There are various H sources. However, in a case where welding is performed in a state where the cleanliness of the weld and gas shielding conditions are strictly controlled, moisture ($H_2O$) contained in the wire is a main H source, and the amount of the moisture strongly affects the amount of diffusible hydrogen in the welded joint. In a case where the steel sheath has a seam, moisture in the atmosphere easily infiltrates into the flux through the seam. Therefore, it is desirable to suppress the infiltration of moisture in the atmosphere into the flux through the steel sheath during the period from the manufacturing of the wire to the use of the wire, by removing the seam of the steel sheath. In a case where the steel sheath has a seam and the period from the manufacturing of the wire to the use of the wire is long, in order to prevent infiltration of a H source such as moisture, it is desirable that the entire flux-cored wire is vacuum packaged, or the flux-cored wire is stored in a container that can be maintained in a dry state.

The amount of hydrogen contained in the flux-cored wire according to this embodiment is not particularly defined, but is preferably 12 ppm or less with respect to the total mass of the flux-cored wire in order to reduce the amount of diffusible hydrogen in the weld metal. There is concern that the amount of hydrogen in the flux-cored wire may be increased by moisture infiltrating into the flux-cored wire during the storage of the flux-cored wire. Therefore, in a case where the period from the manufacturing of the wire to the use of the wire is long, it is desirable to prevent infiltration of moisture by the methods described above.

The diameter of the flux-cored wire according to this embodiment is not particularly defined, but is, for example, φ1.0 to φ2.0 mm. The diameter of a general flux-cored wire is φ1.2 to φ1.6 mm. The filling rate of the flux-cored wire according to this embodiment is not particularly limited as long as the above-described conditions are satisfied. In consideration of the filling rate of a general flux-cored wire, the lower limit of the filling rate of the flux-cored wire according to this embodiment may be, for example, 10% or 12%. The upper limit of the filling rate of the flux-cored wire according to this embodiment may be, for example, 20% or 17%.

The flux-cored wire according to this embodiment may further include a lubricant applied to the surface of the wire. The lubricant applied to the surface of the wire has an effect of improving the wire feedability during welding. Various kinds of lubricant for welding wires can be used. However, in order to suppress the cold-cracking of the weld metal, perfluoropolyether oil (PFPE oil) with no H contained is preferably used. In addition, as described above, the flux-cored wire according to this embodiment may further include a coating formed on the surface of the wire. In this case, the lubricant is applied to the surface of the coating.

Next, a manufacturing method of a flux-cored wire according to this embodiment will be described.

The flux-cored wire of this embodiment can be manufactured by a typical manufacturing process of a flux-cored wire. Hereinafter, an example of the manufacturing method will be described.

The manufacturing method of a flux-cored wire having a seamless shape includes: a step of preparing a flux; a step of forming a steel strip using a forming roll while feeding the steel strip in a longitudinal direction to obtain a U-shaped open tube; a step of supplying the flux into the open tube through an opening of the open tube; a step of performing butt welding on opposite edge portions of the opening of the open tube to obtain a seamless tube; a step of drawing the seamless tube to obtain a flux-cored wire having a predetermined wire diameter; and a step of annealing the flux-cored wire during or after the drawing step. The flux is prepared so that the amount of the fluorides, the amount of the oxides, the amount of the carbonates, the chemical composition, and the like of the flux-cored wire fall within the predetermined ranges described above. In addition, it should be noted that the filling rate of the flux determined by the width and thickness of the steel strip, which is the material of the steel sheath, the filling amount of the flux, and the like also affects the amount of the fluorides, the amount of the oxides, the amount of the carbonates, the chemical composition, and the like of the flux-cored wire. Butt welding is performed by electric resistance welding, laser welding, TIG welding, or the like. In addition, the flux-cored wire is annealed in order to remove moisture in the flux-cored wire during the drawing step or after the drawing step is completed. In order to cause the amount of H in the flux-cored wire to 12 ppm or less, the annealing temperature needs to be 650° C. or higher, and the annealing time needs to be four hours or longer. In order to prevent alteration of the flux, the annealing temperature needs to be 900° C. or lower.

A manufacturing method of a flux-cored wire having a slit-like gap is the same as the manufacturing method of a flux-cored wire having a seamless shape except that a step of forming an open tube and butting end portions of the open tube to obtain a tube having a slit-like gap is provided instead of the step of performing butt welding on the end portions of the open tube to obtain the seamless tube. The manufacturing method of a flux-cored wire having a slit-like gap may further include a step of crimping the butted end portions of the open tube. In the manufacturing method of a flux-cored wire having a slit-like gap, the tube having a slit-like gap is drawn.

A cross section of the flux-cored wire which is subjected to butt seam welding and thus has no slit-like gap is shown in FIG. 2A. Welding traces are observed by polishing and etching the cross section, but the welding traces are not observed unless etching is performed. Therefore, the cross section may be sometimes called seamless as described above. For example, in The Japan Welding Society, "Advanced Welding and Joining Technologies," (2008), Sanpo Publications Inc., p. 111, a flux-cored wire which is subjected to butt seam welding and has no slit-like gap is described as a seamless type wire.

FIG. 2B shows a cross section of a flux-cored wire manufactured by butting end portions of a steel sheath without performing butt seam welding, and FIG. 2C shows a cross section of a flux-cored wire manufactured by butting end portions of a steel sheath and thereafter crimping the end portions without performing butt seam welding. A flux-cored wire with no slit-like gap is obtained even when the gap of the steel sheath of the flux-cored wire in FIGS. 2B and 2C is brazed.

The flux-cored wire of this embodiment described above can be applied to welding of all kinds of steels, and is particularly suitable for use in gas shielded arc welding of a steel having a weld cracking parameter composition Pcm of 0.24% or more. By performing welding using the flux-cored wire of this embodiment, a weld metal having an amount of diffusible hydrogen of 1.0 ml/100 g or less is obtained, so that the occurrence of cold-cracking of the weld metal is suppressed. Even in a case of performing arc welding on a steel (for example, a high strength steel plate having a tensile strength of 590 MPa or more and a plate thickness of 20 mm or more) having a cold-cracking parameter as high as a Pcm of 0.24 or more, the flux-cored wire according to this embodiment can prevent cold-cracking without preheating or at a preheating temperature of 50° C. or lower.

Here, the amount of diffusible hydrogen in this embodiment is the amount of diffusible hydrogen measured by a method based on JIS Z 3118: 2007 "Method of measurement of amount of hydrogen evolved from steel welds". The Pcm (%) of the steel is a value calculated by Formula E.

$$Pcm=(C)+(Si)/30+(Mn)/20+(Cu)/20+(Ni)/60+(Cr)/20+(Mo)/15+(V)/10+5\times(B) \quad \text{Formula E}$$

Each element enclosed by parentheses included in the above formula indicates the amount (mass %) of the element contained in the steel. The amount of an element which is not contained in the steel is regarded as 0 mass %.

Next, a manufacturing method of a welded joint according to this embodiment will be described.

(Manufacturing Method of Welded Joint: Using Flux-Cored Wire According to This Embodiment)

A manufacturing method of a welded joint according to this embodiment includes a step of performing gas shielded arc welding on a steel using the flux-cored wire according to this embodiment. The kind of the steel (material to be welded) which is the parent material of the welded joint in the manufacturing method of a welded joint according to this embodiment is not particularly limited, but is, for example, a steel having a cold-cracking parameter as high as a Pcm of 0.24% or more, and particularly a high strength steel plate having a tensile strength of 590 MPa to 1700 MPa and a plate thickness of 20 mm or more. Since such steel plates have a high cold-cracking parameter, in a case where these steel plates are welded in a manufacturing method of a welded joint according to the related art, the occurrence of cold-cracking cannot be suppressed without sufficient preheating. However, since the welding wire according to this embodiment capable of suppressing cold-cracking is used in the manufacturing method of a welded joint according to this embodiment, in a case where a steel having a high cold-cracking parameter is welded in the manufacturing method of a welded joint according to this embodiment, the occurrence of cold-cracking can be suppressed without performing preheating or while significantly reducing preheating. In the manufacturing method of a welded joint according to this embodiment, since a weld metal having high strength and high toughness can be obtained by using the welding wire according to this embodiment in which the Ceq and the amount of oxygen are preferably controlled, in a case where the manufacturing method of a welded joint according to this embodiment is applied to a high strength steel plate of 590 MPa to 1700 MPa, a welded joint having particularly good mechanical properties can be obtained. The manufacturing method of a welded joint according to this embodiment may also be applied to a steel plate having a tensile strength more than 1000 MPa, such as wear-resistant steel. In this case, a joint obtained by the manufacturing method of a welded joint according to this embodiment may be an undermatched joint in which the tensile strength of the weld metal is lower than the tensile strength of the steel plate parent material.

The kind of a shielding gas used in the manufacturing method of a welded joint according to this embodiment is not particularly limited. In the manufacturing method of a welded joint according to this embodiment, a welded joint having high strength and high toughness can be obtained by exhibiting excellent welding workability regardless of the kind of the shielding gas. However, it is preferable that 100 vol % of carbon dioxide gas, a mixed gas of Ar and 3 to 30 vol % of $CO_2$, and the like, which have been generally and widely used, are used as the shielding gas in the manufacturing method of a welded joint according to this embodiment. In addition, the shielding gas at the time of welding using the flux-cored wire according to this embodiment may contain 5 vol % or less of $O_2$ gas. Since these gases are inexpensive, welding using these gases is advantageous for industrial applicability. Typically, when these gases are used in combination of the rutile-based FCW, a large amount of spatter is incurred, resulting in deterioration of welding workability. However, in the manufacturing method of a welded joint according to this embodiment, since the flux-cored wire according to this embodiment capable of sufficiently suppressing the amount of spatter is used, good welding workability can be exhibited even in a case where these gases are used as the shielding gas.

A welding position in the manufacturing method of a welded joint according to this embodiment is not particularly limited. In the manufacturing method of a welded joint according to this embodiment, since the flux-cored wire according to this embodiment capable of sufficiently suppressing the amount of spatter and sufficiently increasing the viscosity of the molten metal is used, even when the welding position is any of a downhand position, a horizontal position, a vertical position, and an overhead position, good welding workability can be exhibited.

It is preferable that the material to be welded (steel) is one selected from the group consisting of (A) a steel plate having a plate thickness of 12 mm or less and a Pcm of 0.36% or less, (B) a steel plate having a plate thickness of more than 12 mm and 25 mm or less and a Pcm of 0.33% or less, (C) a steel plate having a plate thickness of more than 25 mm and 40 mm or less and a Pcm of 0.31% or less, and (D) a steel plate having a plate thickness of more than 40 mm and 100 mm or less and a Pcm of 0.29% or less, and preheating to 5° C. or higher is performed in a case where the temperature of the steel at the time of the start of the step of performing gas shielded arc welding is lower than 5° C. Even if the welding is performed without preheating while the kind of the steel and the temperature of the steel during welding are within the above-described ranges, cold-cracking does not necessarily occur. Non-destructive inspection such as X-rays or UST may be performed after welding, and in a case where the welded joint has cracks or the like, the cracked portion may be repair welded. In addition, in a case where the temperature of the steel during welding is 5° C. or higher while the kind of the steel is within the above-described range, cold-cracking can be reliably prevented even though preheating is omitted. In the manufacturing method of a welded joint according to this embodiment, since the flux-cored wire capable of sufficiently increasing the cold-cracking resistance properties of the weld metal is used, in a case where a general steel having a tensile strength of 590 MPa to 1700 MPa is the material to be welded, preheating can be omitted in many cases. By using the flux-cored wire according to this embodiment, the cost of welding work including repair welding can be significantly reduced, and welding work and time can be significantly reduced.

Next, a welded joint according to this embodiment will be described.

The welded joint according to this embodiment is obtained by the manufacturing method of a welded joint according to this embodiment. The welded joint according to this embodiment is manufactured by using the welding wire according to this embodiment in which the Ceq, the amount of oxygen, and the amount of the slag forming agent are preferably controlled, and thus has a weld metal having high strength and high toughness, an amount of diffusible hydrogen of 1.0 ml/100 g or less, and a good bead shape. The parent material of the welded joint according to this embodiment is not particularly limited.

A flux-cored wire according to another embodiment of the present invention is a flux-cored wire including a steel sheath and a flux filling the inside of the steel sheath, and is characterized in that the amount of diffusible hydrogen in a weld metal obtained by performing DC gas shielded arc welding using the flux-cored wire under the conditions specified in JIS Z 3118 is 1.0 ml/100 g or less, and the weight of spatter generated per welding time when DC gas shielded arc welding is performed using the flux-cored wire under the condition that the wire side is positive, the welding position is downhand, the current value is 270 A, the voltage value is 30 V, the welding rate is 30 cm/min, the kind of the shielding gas is 100% $CO_2$ gas, and the flow rate of the shielding gas is 25 L/min is 3.5 g/min or less. A flux-cored wire according to another embodiment of the present invention is a flux-cored wire including a steel sheath and a flux filling the inside of the steel sheath, and the flux-cored wire contains, in terms of mass % with respect to the total mass, Al: 0.08% to 0.70%, Ni: 0% to 0.60%, the $TiO_2$-equivalent value of a Ti oxide: 4.30% to 7.50%, and is characterized in that the amount of diffusible hydrogen in a weld metal obtained by performing DC gas shielded arc welding using the flux-cored wire under the conditions specified in JIS Z 3118 is 1.0 ml/100 g or less, and the weight of spatter generated per welding time when DC gas shielded arc welding is performed using the flux-cored wire under the condition that the wire side is positive, the welding position is downhand, the current value is 270 A, the voltage value is 30 V, the welding rate is 30 cm/min, the kind of the shielding gas is 100% $CO_2$ gas, and the flow rate of the shielding gas is 25 L/min 3.5 g/min or less. Since the polarity of the wire is small enough to ignore the effect thereof on the amount of diffusible hydrogen in the weld metal and the amount of spatter generated, the polarity of the wire may be either positive or negative but is preferably positive. For example, in a case where DC gas shielded arc welding is performed using the flux-cored wire according to this embodiment under the condition that the wire side is positive, the welding position is downhand, the current value is 270 A, the voltage value is 30 V, the welding rate is 30 cm/min, the kind of the shielding gas is 100% $CO_2$ gas, and the flow rate of the shielding gas is 25 the amount of diffusible hydrogen in the weld metal can reliably be 1.0 ml/100 g. Since the flux-cored wire according to this embodiment has the above-described features, a weld having excellent cold-cracking resistance properties can be obtained, and the amount of spatter generated during welding can be significantly reduced. Therefore, the flux-cored wire according to this embodiment can make a preheating operation for preventing cracking in the weld metal unnecessary or significantly reduced, or can significantly reduce the amount of spatter generated.

EXAMPLES

Next, the feasibility and effects of the present invention will be described in more detail by examples.

Flux-cored wires of examples and comparative examples were manufactured by the method described below. First, a steel strip was formed using a forming roll while being fed in a longitudinal direction, thereby obtaining a U-shaped open tube. A flux was supplied into the open tube through the opening of the open tube, and opposite edge portions of the opening of the open tube were subjected to butt welding, thereby obtaining a seamless tube. A flux-cored wire having no slit-like gap was obtained by drawing the seamless tube. However, some samples were tubes which were not subjected to seam welding and had a slit-like gap, and the tubes were drawn. In this manner, flux-cored wires having a final wire diameter of ϕ1.2 mm were produced. The flux-cored wires were annealed in a temperature range of 650° C. to 950° C. for four or more hours during the operation of drawing the flux-cored wires. After the production, a lubricant was applied to the surface of the wire. The configurations of the flux-cored wires are shown in Tables 1-1 to 3-3.

The unit of the amount of each of fluorides, the amount of each of oxides, the total amount of the oxides (excluding a Ti oxide and a Ca oxide), the amount of each of carbonates, the total amount of the carbonates, the amount of Fe powder, and the amount of each of elements contained as alloying elements disclosed in Tables 1-1 to 3-3 is mass % with respect to the total mass of the flux-cored wire. The F-equivalent value of the flux-cored wires disclosed in Tables 1-1 to 1-3 indicates the amount of fluorine (F) contained in the fluorides of the flux-cored wire in terms of mass % with respect to the total mass of the flux-cored wire. The Z value (spatter generation index Z) and V value of the flux-cored wires disclosed in Tables 1-1 to 1-3 are values obtained by Formula B and Formula C.

$$Z = 0.70 \times ([Na_3AlF_6]+[NaF]+[MgF_2])+0.80 \times ([K_2SiF_6]+[K_2ZrF_6])+0.90 \times ([LiF]+[BaF_2])+3.50 \times ([CaF_2]) \qquad \text{Formula B}$$

$$V = ([TiO_2]+1.2 \times [SiO_2]+1.4 \times [Al_2O_3]+1.5 \times [ZrO_2])/(F)^{1/2} \qquad \text{Formula C}$$

In the above two formulas, each chemical formula enclosed by square brackets indicates the amount of the compound related to the chemical formula in terms of mass % with respect to the total mass of the flux-cored wire, and the symbol "F" is the F-equivalent value of the flux-cored wires.

The remainder of the flux-cored wires disclosed in the tables (that is, elements other than the elements disclosed in Tables 1-1 to 3-3) was iron and impurities. The flux-cored wires disclosed in the tables had a seamless shape unless otherwise noted in the "Remarks" column, and palm oil was applied as a lubricating oil. Each element contained as an alloying element in the flux-cored wires disclosed in Tables 3-1 to 3-3 was in the form of the steel sheath or metal powder. In Tables 1-1 to 3-3, numerical values outside the range defined by the present invention were underlined. In addition, blanks in the tables related to the chemical composition or the amounts of the compounds and the like mean that the chemical composition, compounds, and the like are not intentionally added. Such chemical compositions, compounds, and the like may be incorporated unavoidably or produced.

The flux-cored wires of the examples and the comparative examples were evaluated by the method described below. The kind of welding gas at the time of evaluation was 100% $CO_2$ gas unless otherwise noted in the "Remarks" column. In addition, at the time of evaluation, all the welding currents were DC currents, and the polarity of all the wires was positive.

In order to evaluate the mechanical properties (tensile strength and toughness) and the amount of diffusible hydrogen of the weld metal obtained by using the flux-cored wire, using the flux-cored wire, a parent material having a plate thickness of 20 mm was butted with a root gap of 16 mm at a groove angle of 20 degrees, and was subjected to downhand welding using a backing strip under Welding condition 1 shown in Table 5. The parent material and the backing strip were SM490A. On the groove surface of the parent material and the surface of the backing strip, buttering to two or more layers and a weld reinforcement height of 3 mm or more was conducted using the flux-cored wire to be tested. For other welding conditions, Condition 1 described in Table 5 was used in a case of evaluating tensile strength and toughness, and Condition 4 described in Table 5 was used in a case of evaluating the amount of diffusible hydrogen. The strength of the weld metal obtained in this manner was evaluated by a tension test, and the toughness was evaluated by a Charpy impact test at −40° C. From the weld metal obtained by the downhand welding test, as shown in FIG. 1, an A1 tension test piece (round bar) 5 based on JIS Z 3111 (2005), and a No. 4 Charpy test piece (2 mm V notch) 4 were extracted, and provided for the tension test and the Charpy impact test. Measurement of the amount of diffusible hydrogen in the weld metal was performed according to a gas chromatography method based on JIS Z 3118 (Method of measurement of amount of hydrogen evolved from steel welds). A flux-cored wire which caused the weld metal to have a tensile strength of 490 MPa or more was accepted for tensile strength. This is because in a case where the tensile strength of the weld metal is less than 490 MPa, the welded joint becomes an undermatched joint (a joint in which the tensile strength of the weld metal is significantly lower than the tensile strength of the parent material), and strain concentration on the weld metal and fracture in the weld metal easily occur. In addition, a flux-cored wire which caused the weld metal to have a Charpy absorbed energy at −40° C. of 47 J or more was accepted for low temperature toughness. A flux-cored wire which caused the weld metal to have an amount of diffusible hydrogen of 1.0 ml/100 g or less was accepted for the amount of diffusible hydrogen.

In addition, in order to evaluate the welding workability and the like of vertical welding using the flux-cored wire, vertical upward fillet welding and vertical upward bead on plate welding were performed on the parent material described above. For welding conditions, Welding condition 2 shown in Table 5 was used in a case of evaluating the amount of spatter, and Welding condition 3 shown in Table 5 was used in a case of evaluating vertical weldability, bead shape, and slag incorporation. The workability of the vertical welding was evaluated based on the presence or absence of metal dripping, the amount of spatter generated, slag peelability, and the result of visual inspection of bead shapes. Thereafter, the presence or absence of slag incorporation defects in five cross sections of the weld obtained by the above-described method were visually investigated. Deterioration of the presence or absence of metal dripping, evaluation of the slag peelability, and valuation of the bead shapes were performed on both the vertical upward fillet welding and vertical upward bead on plate welding.

Regarding the vertical weldability, when welding was performed at a welding current of 180 A, a case where dripping of molten metal had occurred was rejected, and a case where dripping of molten metal had not occurred was accepted. The slag peelability was rejected when peeling had not occurred by brushing using a steel brush and was accepted when peeling had occurred. Regarding evaluation of the appearance of the bead shapes, a case where convex beads had occurred was rejected, and a case where such defects had not occurred was accepted. The deterioration of the presence or absence of the slag incorporation defects was performed only by the vertical upward fillet welding. A case where slag incorporation had occurred even in a single cross section among the five cross sections was rejected, and no slag incorporation in all the five cross sections was accepted. The amount of spatter generated was evaluated by the amount of spatter generated for an arc time of one minute, which was obtained by dividing the weight of the spatter generated during welding by the welding time. A flux-cored wire which caused the amount of spatter generated to be 3.5 g/min or less was accepted for the amount of spatter generated.

Evaluation of the cold-cracking resistance properties was performed by conducting a test based on JIS Z 3157 (U-groove weld cracking test) on a welded joint obtained by welding a wear-resistant steel having a Brinell hardness of 500 HB, a Pcm of 0.36, and a plate thickness of 25 mm under Welding condition 6 shown in Table 5 under control of a constant atmosphere at a temperature of 5° C. and a humidity of 60%, and conducting a test based on JIS Z 3158 (y-groove weld cracking test) on a welded joint obtained by performing welding under Welding condition 5 in Table 5. A flux-cored wire applied to the welded joint where no cracking had occurred in both the U-groove weld cracking test and the y-groove weld cracking test was accepted for cold-cracking resistance properties.

The test results obtained by the above-described method are shown in Tables 4-1 to 4-3. In a case of performing welding using the flux-cored wire in the examples of the present invention, even though the temperature of a welding environment was 5° C., which is considered to be a very low temperature in view of technical common sense, and the steel was not preheated, no cross-sectional cracking had occurred in all the cross sections in the U-groove weld cracking test. Therefore, it was proved that the flux-cored wire in the examples of the present invention has extremely high cold-cracking resistance properties. Furthermore, as shown in the rest results in Tables 4-1 to 4-3, the flux-cored wire in the examples of the present invention exhibited good welding workability even in a case of being provided for vertical upward welding. Furthermore, the flux-cored wire in the examples of the present invention was accepted for all the evaluation items of the tensile strength of the weld metal, the toughness of the weld metal, the amount of diffusible hydrogen in the weld metal, the cold-cracking resistance properties, and the amount of spatter generated. On the other hand, the comparative examples did not satisfy any of the requirements specified in the present invention and thus were rejected for one or more evaluation items.

TABLE 1-1

| Wire No. | Fluoride (mass %) | | | | | | | F-equivalent value (mass %) | Oxide (mass %) | | |
| --- | --- | --- | --- | --- | --- | --- | --- | --- | --- | --- | --- |
| | $CaF_2$ | $MgF_2$ | LiF | NaF | $K_2ZrF_6$ | $BaF_2$ | $K_2SiF_6$ | $Na_3AlF_6$ | | $TiO_2$-equivalent value | $SiO_2$-equivalent value | $Al_2O_3$-equivalent value |
| 1 | | 0.50 | | 0.50 | | | | | 0.51 | 5.00 | 0.20 | 0.60 |
| 2 | 0.47 | | | | | 0.10 | | | 0.25 | 5.30 | 0.50 | 0.10 |
| 3 | | | | 0.37 | | | 0.10 | | 0.22 | 5.50 | 0.40 | 0.10 |

TABLE 1-1-continued

| Wire No. | | | | | | | | | | |
|---|---|---|---|---|---|---|---|---|---|---|
| 4 | 0.50 | | | | 0.50 | | 0.56 | 4.30 | 0.50 | 0.29 |
| 5 | 0.50 | | | 0.10 | | | 0.35 | 7.50 | 0.20 | 0.30 |
| 6 | | 0.50 | | 0.10 | | | 0.41 | 5.40 | 0.56 | 0.30 |
| 7 | | | | 0.28 | | | 0.11 | 5.40 | 0.20 | 0.00 |
| 8 | | | | 0.10 | 0.50 | | 0.30 | 5.00 | 0.70 | 0.70 |
| 9 | | | 0.30 | | | | 0.14 | 5.30 | 0.50 | 0.30 |
| 10 | 0.70 | | | | 0.80 | | 0.84 | 4.40 | 0.20 | |
| 11 | | 0.30 | | | 0.10 | | 0.27 | 6.30 | 0.80 | 0.60 |
| 12 | 0.40 | | 0.70 | | 0.10 | | 0.56 | 5.60 | 0.40 | 0.30 |
| 13 | | | | 0.70 | 0.10 | | 0.33 | 5.00 | 0.50 | 0.30 |
| 14 | | | | | 0.10 | 0.70 | 0.43 | 5.20 | 0.60 | 0.20 |
| 15 | 1.00 | | 0.10 | | | | 0.66 | 5.40 | 0.20 | 0.30 |
| 16 | | 1.00 | 0.10 | | | | 0.78 | 5.40 | 0.60 | 0.30 |
| 17 | | | 0.10 | 1.00 | | | 0.45 | 5.60 | 0.50 | 0.30 |
| 18 | | | 0.10 | | 1.00 | | 0.56 | 5.60 | 0.60 | 0.80 |
| 19 | | | 0.10 | | | 1.00 | 0.59 | 5.40 | 0.30 | 0.10 |
| 20 | 0.10 | 1.20 | | | | | 0.94 | 5.30 | 0.50 | 0.30 |
| 21 | 0.10 | | 1.20 | | | | 0.60 | 5.40 | 0.40 | 0.30 |
| 22 | 0.10 | | | 1.20 | | | 0.54 | 5.50 | 0.50 | 0.29 |
| 23 | 0.10 | | | | 1.20 | | 0.68 | 5.60 | 0.20 | 0.30 |
| 24 | 0.10 | | | | | 1.20 | 0.71 | 5.30 | 0.50 | 0.60 |
| 25 | 0.60 | | | | | 0.10 | 0.42 | 5.60 | 0.30 | 0.30 |
| 26 | | 0.60 | | | | 0.10 | 0.49 | 5.40 | 0.45 | |
| 27 | | | 0.60 | | | 0.10 | 0.33 | 5.00 | 0.50 | 0.30 |
| 28 | | | | 0.60 | | 0.10 | 0.30 | 5.40 | 0.50 | 0.70 |
| 29 | | | | | 0.60 | 0.10 | 0.36 | 5.30 | | 0.30 |
| 30 | 0.20 | 0.60 | | | | | 0.56 | 5.00 | 0.40 | 0.60 |
| 31 | | 0.20 | 0.60 | | | | 0.42 | 5.40 | 0.56 | 0.30 |
| 32 | | | 0.20 | 0.60 | | | 0.33 | 5.70 | 0.80 | |
| 33 | | | | 0.20 | 0.60 | | 0.39 | 5.40 | 0.50 | 0.40 |
| 34 | | | | | 0.20 | 0.60 | 0.43 | 4.80 | 0.20 | 0.30 |
| 35 | 0.60 | 0.20 | | | | | 0.51 | 5.30 | 0.30 | 0.29 |

| | Oxide (mass %) | | | | | | | | Total amount of |
|---|---|---|---|---|---|---|---|---|---|
| Wire No. | $ZrO_2$-equivalent value | MgO-equivalent value | CaO-equivalent value | NaO-equivalent value | $K_2O$-equivalent value | BaO-equivalent value | $MnO_2$-equivalent value | FeO-equivalent value | oxides excluding Ti oxide and Ca oxide (mass %) |
| 1 | 0.23 | 0.40 | | 0.05 | 0.02 | | | 0.10 | 1.60 |
| 2 | 0.50 | | | 0.05 | 0.02 | | | 0.10 | 1.27 |
| 3 | 0.50 | | | | | | | 0.14 | 1.14 |
| 4 | 0.50 | | | 0.05 | 0.02 | | | 0.10 | 1.46 |
| 5 | 0.50 | | | 0.05 | 0.02 | | 0.02 | | 1.09 |
| 6 | 0.50 | | 0.18 | 0.05 | 0.02 | | | 0.10 | 1.53 |
| 7 | 0.00 | | | 0.08 | 0.02 | | | 0.10 | 0.40 |
| 8 | 0.80 | | | 0.04 | 0.02 | | | 0.10 | 2.36 |
| 9 | 0.50 | | | | | | | 0.10 | 1.40 |
| 10 | 0.20 | | | | | | | 0.10 | 0.50 |
| 11 | 0.80 | | | | | | | 0.10 | 2.30 |
| 12 | 0.50 | | | 0.05 | 0.02 | | | 0.10 | 1.37 |
| 13 | 0.50 | | | 0.05 | 0.02 | | | | 1.37 |
| 14 | 0.40 | | | 0.05 | 0.02 | | | 0.15 | 1.42 |
| 15 | 0.50 | | | 0.04 | 0.02 | | | 0.10 | 1.16 |
| 16 | 0.54 | | | 0.04 | 0.02 | | | 0.12 | 1.62 |
| 17 | 0.50 | | | | | | | 0.10 | 1.40 |
| 18 | 0.60 | | | 0.04 | 0.02 | | | 0.10 | 2.16 |
| 19 | 0.50 | | | 0.04 | 0.02 | 0.02 | | | 0.98 |
| 20 | 0.20 | | | 0.04 | 0.02 | | | 0.10 | 1.16 |
| 21 | 0.50 | | | 0.04 | 0.02 | | | 0.16 | 1.42 |
| 22 | 0.01 | | | 0.03 | 0.02 | | | 0.10 | 0.95 |
| 23 | 0.50 | | | 0.05 | 0.02 | | | 0.08 | 1.15 |
| 24 | 0.50 | | | 0.05 | 0.02 | | | 0.10 | 1.77 |
| 25 | 0.60 | | | | | | | 0.10 | 1.30 |
| 26 | 0.50 | | | | | | | | 0.95 |
| 27 | 0.50 | 0.90 | | | | | | 0.10 | 2.30 |
| 28 | | | | 0.04 | 0.02 | | | 0.10 | 1.36 |
| 29 | 0.50 | | | 0.04 | 0.02 | | | 0.16 | 1.02 |
| 30 | 0.50 | | | 0.04 | 0.02 | | | | 1.56 |
| 31 | 0.50 | | | 0.05 | 0.02 | | | 0.10 | 1.53 |
| 32 | 0.23 | | | 0.05 | 0.02 | | | 0.10 | 1.20 |
| 33 | 0.50 | | | 0.05 | 0.02 | | | 0.14 | 1.61 |
| 34 | 0.50 | | | 0.05 | 0.02 | | | 0.10 | 1.17 |
| 35 | 0.50 | | | 0.05 | 0.02 | | | | 1.16 |

TABLE 1-2

| Wire No. | Fluoride (mass %) | | | | | | | F-equivalent value (mass %) | Oxide (mass %) | | |
|---|---|---|---|---|---|---|---|---|---|---|---|
| | $CaF_2$ | $MgF_2$ | LiF | NaF | $K_2ZrF_6$ | $BaF_2$ | $K_2SiF_6$ | $Na_3AlF_6$ | $TiO_2$-equivalent value | $SiO_2$-equivalent value | $Al_2O_3$-equivalent value |
| 36 | | | 0.60 | 0.20 | | | | | 0.53 | 5.40 | 0.50 | 0.30 |
| 37 | | | | 0.60 | 0.20 | | | | 0.35 | 5.40 | 0.50 | 0.60 |
| 38 | | | | | 0.60 | | 0.20 | | 0.34 | 5.30 | 0.20 | |
| 39 | | | | | | | 0.60 | 0.20 | 0.42 | 5.40 | 0.50 | 0.30 |
| 40 | | 0.50 | | 0.50 | | | | | 0.51 | 5.70 | 0.50 | 0.30 |
| 41 | | | 0.50 | 0.50 | | | | | 0.59 | 5.40 | 0.40 | 0.30 |
| 42 | | | | 0.50 | | | 0.50 | | 0.48 | 4.80 | 0.80 | 0.10 |
| 43 | | | | | | | 0.50 | 0.50 | 0.53 | 5.30 | 0.50 | 0.30 |
| 44 | | | 0.50 | 0.50 | | | | | 0.57 | 5.00 | 0.20 | 0.30 |
| 45 | | 0.50 | | 0.50 | | | | | 0.53 | 5.40 | 0.30 | |
| 46 | | | | 0.50 | | | 0.50 | | 0.46 | 5.30 | 0.50 | |
| 47 | | | | 0.50 | | 0.50 | | | 0.31 | 5.00 | 0.40 | |
| 48 | | | | | | 0.50 | 0.50 | | 0.37 | 5.30 | 0.50 | |
| 49 | | 0.80 | | 0.80 | | | | | 0.81 | 6.10 | 0.20 | 0.60 |
| 50 | | | 0.80 | 0.80 | | | | | 0.95 | 5.80 | 0.40 | 0.29 |
| 51 | | | 0.80 | | | | 0.80 | | 0.78 | 5.60 | 0.40 | 0.30 |
| 52 | | | | | | | 0.80 | 0.80 | 0.85 | 6.20 | 0.56 | |
| 53 | | | | 0.80 | | | | | 0.32 | 5.40 | 0.50 | 0.29 |
| 54 | | 0.80 | | | | | | | 0.59 | 5.30 | 0.80 | 0.30 |
| 55 | 0.80 | | | 0.80 | | | | | 0.81 | 5.00 | 0.50 | 0.60 |
| 56 | | | | 0.80 | | 0.80 | | | 0.50 | 5.30 | 0.20 | 0.29 |
| 57 | | 0.40 | | 0.20 | | | | | 0.32 | 5.00 | 0.20 | 0.30 |
| 58 | | | 0.40 | 0.20 | | | | | 0.38 | 6.10 | 0.50 | 0.60 |
| 59 | | | | 0.40 | | | 0.20 | | 0.28 | 4.80 | 0.20 | 0.30 |
| 60 | | | | | | | 0.20 | 0.40 | 0.32 | 5.30 | 0.30 | 0.29 |
| 61 | | | 0.40 | 0.20 | | | | | 0.26 | 5.40 | 0.50 | 0.30 |
| 62 | | | 0.40 | | | | | | 0.29 | 5.50 | 0.40 | 0.60 |
| 63 | | 0.40 | | 0.20 | | | | | 0.32 | 5.60 | 0.50 | 0.29 |
| 64 | 0.20 | | | | 0.60 | 0.20 | | | 0.38 | 5.60 | 0.20 | 0.30 |
| 65 | | | | 0.60 | | | 0.10 | | 0.32 | 5.40 | 0.57 | 0.26 |
| 66 | | | | 0.70 | | | | | 0.32 | 5.40 | 0.65 | 0.66 |
| 67 | | 0.80 | | | | | | | 0.49 | 5.40 | 0.56 | 0.30 |
| 68 | 0.40 | | | | | | 0.10 | | 0.25 | 5.30 | 0.50 | 0.10 |
| 69 | | 0.40 | 0.10 | | | | | | 0.29 | 5.00 | 0.40 | |

| Wire No. | Oxide (mass %) | | | | | | | | Total amount of oxides excluding Ti oxide and Ca oxide (mass %) |
|---|---|---|---|---|---|---|---|---|---|
| | $ZrO_2$-equivalent value | MgO-equivalent value | CaO-equivalent value | NaO-equivalent value | $K_2O$-equivalent value | BaO-equivalent value | $MnO_2$-equivalent value | FeO-equivalent value | |
| 36 | 0.01 | | | 0.04 | 0.03 | | | 0.10 | 0.98 |
| 37 | 0.01 | | | 0.04 | 0.03 | | | 0.10 | 1.28 |
| 38 | 0.50 | | | 0.04 | 0.02 | | | 0.10 | 0.86 |
| 39 | 0.50 | | | 0.03 | 0.02 | | | 0.10 | 1.45 |
| 40 | 0.50 | | | 0.04 | 0.02 | | | | 1.36 |
| 41 | 0.23 | | | 0.04 | 0.03 | | | | 1.00 |
| 42 | 0.50 | 0.90 | | 0.04 | 0.03 | | | | 2.37 |
| 43 | 0.50 | | | | | | | | 1.30 |
| 44 | 0.23 | | | | | | | | 0.73 |
| 45 | 0.50 | | | 0.04 | 0.02 | | | | 0.86 |
| 46 | 0.50 | | | 0.04 | 0.03 | | | | 1.07 |
| 47 | | | | 0.04 | 0.03 | | | | 0.47 |
| 48 | 0.23 | | | 0.03 | 0.03 | | | | 0.79 |
| 49 | 0.50 | | | 0.04 | 0.03 | | | | 1.37 |
| 50 | 0.50 | | | 0.04 | 0.03 | 0.01 | | 0.10 | 1.37 |
| 51 | 0.01 | | | 0.04 | 0.03 | | | 0.10 | 0.88 |
| 52 | 0.50 | | | | | | | 0.10 | 1.16 |
| 53 | 0.50 | | | | | | | 0.10 | 1.39 |
| 54 | 0.50 | | | 0.04 | 0.02 | | | 0.10 | 1.76 |
| 55 | 0.23 | | | 0.04 | 0.02 | | | 0.10 | 1.49 |
| 56 | 0.50 | 0.40 | | 0.04 | 0.02 | | 0.01 | 0.10 | 1.56 |
| 57 | 0.45 | | | | | | | 0.30 | 1.25 |
| 58 | 0.01 | | | | | | | 0.20 | 1.31 |
| 59 | 0.50 | | | 0.04 | 0.03 | | | 0.10 | 1.17 |
| 60 | 0.50 | | | 0.04 | 0.03 | | | | 1.16 |
| 61 | 0.01 | | | 0.04 | 0.03 | | | 0.10 | 0.98 |
| 62 | 0.50 | | | 0.04 | 0.02 | | | 0.10 | 1.66 |
| 63 | 0.50 | | | 0.04 | 0.02 | | | 0.10 | 1.45 |
| 64 | 0.50 | | | 0.04 | 0.02 | | | 0.10 | 1.16 |
| 65 | 0.54 | | | 0.05 | 0.03 | | | 0.10 | 1.55 |

TABLE 1-2-continued

| 66 | 0.58 | | | | | | | | | | | | 1.89 |
| 67 | 0.50 | | | | | | | | | | | 0.10 | 1.46 |
| 68 | 0.50 | | | | | | | | | 0.04 | 0.03 | | 0.10 | 1.27 |
| 69 | 0.60 | | | | | | | | | 0.04 | 0.03 | | 0.10 | 1.17 |

TABLE 1-3

| Wire No. | Fluoride (mass %) | | | | | | | | F-equivalent value (mass %) | Oxide (mass %) | | |
| --- | --- | --- | --- | --- | --- | --- | --- | --- | --- | --- | --- | --- |
| | $CaF_2$ | $MgF_2$ | LiF | NaF | $K_2ZrF_6$ | $BaF_2$ | $K_2SiF_6$ | $Na_3AlF_6$ | | $TiO_2$-equivalent value | $SiO_2$-equivalent value | $Al_2O_3$-equivalent value |
| 70 | 0.70 | | | 0.70 | | | | | 0.66 | 5.40 | 0.50 | 0.60 |
| 71 | 0.15 | | | | 0.05 | | | | 0.09 | 6.00 | 0.80 | 0.78 |
| 72 | | 0.60 | 0.20 | | | | | | 0.51 | 3.00 | 0.50 | 0.30 |
| 73 | | | 0.60 | 0.20 | | | | | 0.53 | 8.00 | 0.20 | 0.60 |
| 74 | | | | 0.60 | 0.20 | | | | 0.35 | 5.00 | 0.30 | 0.30 |
| 75 | | | | 0.60 | | | 0.20 | | 0.34 | 4.30 | 0.20 | |
| 76 | | | | | | | 0.60 | 0.20 | 0.42 | 5.40 | 1.20 | 1.20 |
| 77 | | 0.50 | | 0.50 | | | | | 0.51 | 5.00 | 0.60 | 0.30 |
| 78 | | | 0.35 | 0.40 | | | 0.40 | | 0.64 | 4.00 | | 0.10 |
| 79 | | | | 0.26 | | | | | 0.12 | 6.80 | 0.80 | 0.30 |
| 80 | | | | | | | 0.50 | 0.50 | 0.53 | 5.80 | 0.50 | 0.30 |
| 81 | | | 0.50 | | 0.50 | | | | 0.57 | 5.60 | 0.60 | 0.30 |
| 82 | | 0.50 | | 0.50 | | | | | 0.53 | 5.40 | 0.30 | 0.10 |
| 83 | | | | 0.50 | | | 0.50 | | 0.46 | 5.80 | 0.50 | 0.30 |
| 84 | | | | 0.50 | | 0.50 | | | 0.31 | 5.60 | 0.60 | 0.30 |
| 85 | | | | | | 0.50 | 0.50 | | 0.37 | 5.40 | 0.30 | 0.10 |
| 86 | | 0.80 | | | 0.80 | | | | 0.81 | 5.30 | 0.50 | 0.30 |
| 87 | | | 0.20 | 0.20 | | | | | 0.24 | 5.40 | 0.40 | 0.30 |
| 88 | 0.50 | | | 0.80 | | | 0.80 | | 1.02 | 5.50 | 0.50 | 0.29 |
| 89 | | | | | | | 0.80 | 0.80 | 0.85 | 5.60 | 0.20 | 0.30 |
| 90 | 0.40 | | | 0.90 | | | | | 0.60 | 5.30 | 0.50 | 0.60 |
| 91 | | | 0.47 | | | | | | 0.34 | 7.50 | 0.40 | 0.30 |
| 92 | | 0.38 | | | | | | | 0.23 | 4.80 | 0.40 | 0.30 |
| 93 | 1.50 | 0.40 | | | | 0.20 | | | 1.02 | 1.50 | 0.80 | 0.20 |

| Wire No. | Oxide (mass %) | | | | | | | | Total amount of oxides excluding Ti oxide and Ca oxide (mass %) |
| --- | --- | --- | --- | --- | --- | --- | --- | --- | --- |
| | $ZrO_2$-equivalent value | MgO-equivalent value | CaO-equivalent value | NaO-equivalent value | $K_2O$-equivalent value | BaO-equivalent value | $MnO_2$-equivalent value | FeO-equivalent value | |
| 70 | 0.50 | | | 0.05 | 0.02 | | | 0.10 | 1.77 |
| 71 | 0.60 | | | 0.05 | 0.02 | | | 0.10 | 2.35 |
| 72 | 0.23 | | | 0.05 | 0.02 | | | 0.10 | 1.20 |
| 73 | 0.50 | | | 0.05 | 0.02 | | | 0.10 | 1.47 |
| 74 | 0.45 | | 0.40 | 0.04 | 0.02 | | | 0.10 | 1.21 |
| 75 | 0.01 | | | 0.04 | 0.02 | | | | 0.27 |
| 76 | 0.80 | | | | | 0.01 | | 0.10 | 3.31 |
| 77 | 0.54 | | | | | | | 0.10 | 1.54 |
| 78 | | | | 0.05 | 0.02 | | | 0.10 | 0.27 |
| 79 | 0.80 | | | | | | | 0.10 | 2.00 |
| 80 | 0.50 | | | 0.04 | 0.02 | | | 0.10 | 1.46 |
| 81 | 0.60 | | | 0.05 | 0.02 | | | 0.10 | 1.67 |
| 82 | 0.50 | | | 0.05 | 0.02 | | | 0.10 | 1.07 |
| 83 | 0.50 | | | 0.05 | 0.02 | | 0.01 | 0.10 | 1.48 |
| 84 | 0.60 | | | 0.05 | 0.02 | | | | 1.57 |
| 85 | 0.50 | | | 0.04 | 0.02 | | | 0.10 | 1.06 |
| 86 | 0.20 | | | 0.04 | 0.02 | | | 0.10 | 1.16 |
| 87 | 0.50 | | | | | | | 0.10 | 1.30 |
| 88 | 0.01 | | | | | | | 0.10 | 0.90 |
| 89 | 0.50 | | | | | | | 0.10 | 1.10 |
| 90 | 0.50 | | | 0.05 | 0.02 | | | 0.10 | 1.77 |
| 91 | 0.70 | | | 0.05 | 0.02 | | | | 1.47 |
| 92 | 0.70 | | | 0.05 | 0.02 | | | | 1.47 |
| 93 | 0.20 | | | 0.05 | 0.02 | | | | 1.27 |

TABLE 2-1

| Wire No. | Carbonate (mass %) CaCO₃ | Na₂CO₃ | Other | Total amount of carbonate (mass %) | Z value (mass %) | V value | Fe powder (mass %) | Remarks |
|---|---|---|---|---|---|---|---|---|
| 1 | | | | 0.00 | 0.75 | 9.0 | 3.5 | Wire having seam |
| 2 | | | | 0.00 | 1.74 | 13.6 | 3.8 | |
| 3 | | | | 0.00 | 0.34 | 14.7 | 3.4 | |
| 4 | | | | 0.00 | 0.75 | 8.1 | 3.9 | |
| 5 | | | | 0.00 | 0.43 | 15.2 | 0.0 | |
| 6 | | | | 0.00 | 0.53 | 11.4 | 2.6 | |
| 7 | | | | 0.00 | 0.22 | 16.8 | 4.9 | |
| 8 | | | | 0.00 | 0.48 | 14.7 | 2.8 | |
| 9 | | 0.60 | | 0.60 | 0.21 | 19.2 | 2.8 | |
| 10 | | | | 0.00 | 1.13 | 5.4 | 4.6 | |
| 11 | | | | 0.00 | 0.35 | 17.9 | 2.0 | |
| 12 | | | | 0.00 | 1.97 | 9.7 | 2.3 | |
| 13 | | | | 0.00 | 0.64 | 11.7 | 3.8 | |
| 14 | | | | 0.00 | 0.57 | 10.3 | 3.5 | |
| 15 | | | | 0.00 | 0.77 | 8.4 | 3.3 | |
| 16 | | | | 0.00 | 0.97 | 8.3 | 1.5 | |
| 17 | | | | 0.00 | 0.87 | 11.0 | 0.0 | |
| 18 | | | | 0.00 | 0.87 | 11.1 | 1.0 | |
| 19 | | | | 0.00 | 0.77 | 8.7 | 2.9 | |
| 20 | | | | 0.00 | 1.15 | 6.8 | 3.1 | |
| 21 | | | | 0.00 | 0.91 | 9.1 | 2.7 | |
| 22 | | | | 0.00 | 1.03 | 8.8 | 2.6 | |
| 23 | | | | 0.00 | 1.03 | 8.5 | 2.3 | |
| 24 | | | | 0.00 | 0.91 | 8.9 | 1.8 | |
| 25 | 0.20 | | | 0.20 | 0.49 | 11.2 | 1.4 | Welding using Ar - 20% CO₂ gas |
| 26 | | 0.20 | | 0.20 | 0.61 | 9.5 | 0.0 | Welding using Ar - 20% CO₂ gas |
| 27 | | | 0.20 | 0.20 | 0.49 | 11.9 | 2.2 | Kind of carbonate: MgCO₃ |
| 28 | | | 0.15 | 0.15 | 0.55 | 12.8 | 2.9 | Kind of carbonate: LiCO₃ |
| 29 | | | 0.15 | 0.15 | 0.55 | 10.7 | 4.1 | Kind of carbonate: K₂CO₃ |
| 30 | | | 0.15 | 0.15 | 0.68 | 9.4 | 2.9 | Kind of carbonate: BaCO₃ |
| 31 | | | 0.15 | 0.15 | 0.60 | 11.2 | 3.2 | Kind of carbonate: FeCO₃ |
| 32 | | | 0.15 | 0.15 | 0.62 | 12.2 | 2.5 | Kind of carbonate: MnCO₃ |
| 33 | | | | 0.00 | 0.64 | 11.7 | 2.0 | |
| 34 | | | | 0.00 | 0.58 | 9.5 | 4.0 | |
| 35 | | | | 0.00 | 0.60 | 9.5 | 4.2 | |

TABLE 2-2

| Wire No. | Carbonate (mass %) CaCO₃ | Na₂CO₃ | Other | Total amount of carbonate (mass %) | Z value (mass %) | V value | Fe powder (mass %) | Remarks |
|---|---|---|---|---|---|---|---|---|
| 36 | | | | 0.00 | 0.68 | 8.8 | 0.0 | Welding using Ar - 20% CO₂ gas |
| 37 | | | | 0.00 | 0.58 | 11.6 | 3.4 | Perfluoropolyether applied |
| 38 | | | | 0.00 | 0.64 | 10.7 | 3.8 | |
| 39 | | | | 0.00 | 0.62 | 11.1 | 2.4 | |
| 40 | | | | 0.00 | 0.75 | 10.5 | 2.9 | |
| 41 | | | | 0.00 | 0.80 | 8.6 | 3.0 | |
| 42 | | | | 0.00 | 0.75 | 9.6 | 2.8 | |
| 43 | | | | 0.00 | 0.75 | 9.7 | 0.0 | |
| 44 | | | | 0.00 | 0.85 | 8.0 | 4.2 | |
| 45 | | | | 0.00 | 0.70 | 8.9 | 3.0 | |
| 46 | | | | 0.00 | 0.80 | 9.8 | 3.3 | |
| 47 | | | | 0.00 | 0.85 | 9.9 | 4.3 | |
| 48 | | | | 0.00 | 0.85 | 10.3 | 4.0 | |
| 49 | | | | 0.00 | 1.20 | 8.8 | 0.0 | |
| 50 | | | | 0.00 | 1.28 | 7.6 | 1.8 | |
| 51 | | | | 0.00 | 1.20 | 7.4 | 2.7 | |
| 52 | | | | 0.00 | 1.20 | 8.3 | 1.1 | |
| 53 | | | | 0.00 | 0.64 | 12.6 | 3.6 | |
| 54 | | | | 0.00 | 0.72 | 9.7 | 2.8 | |
| 55 | | | | 0.00 | 1.20 | 7.5 | 3.0 | |
| 56 | | | | 0.00 | 1.36 | 9.5 | 2.6 | Welding using Ar - 20% CO₂ gas |
| 57 | | | | 0.00 | 0.44 | 11.1 | 4.1 | Welding using Ar - 5% CO₂ gas |
| 58 | | | | 0.00 | 0.50 | 12.2 | 3.2 | Welding using Ar - 10% CO₂ gas |
| 59 | | | | 0.00 | 0.44 | 11.6 | 3.3 | Welding using Ar - 20% CO₂ - 3% O₂ gas |

TABLE 2-2-continued

| Wire No. | Carbonate (mass %) CaCO$_3$ | Na$_2$CO$_3$ | Other | Total amount of carbonate (mass %) | Z value (mass %) | V value | Fe powder (mass %) | Remarks |
|---|---|---|---|---|---|---|---|---|
| 60 | | | | 0.00 | 0.44 | 12.0 | 3.9 | |
| 61 | | | | 0.00 | 0.44 | 12.6 | 3.4 | |
| 62 | | | | 0.00 | 0.36 | 14.0 | 3.2 | |
| 63 | | | | 0.00 | 0.44 | 12.9 | 2.7 | |
| 64 | | | | 0.00 | 1.36 | 11.3 | 3.0 | |
| 65 | | | | 0.00 | 0.50 | 12.8 | 2.2 | |
| 66 | | | | 0.00 | 0.49 | 14.2 | 2.9 | |
| 67 | | | | 0.00 | 0.56 | 10.4 | 2.7 | |
| 68 | | | | 0.00 | 1.48 | 13.7 | 3.0 | |
| 69 | | | | 0.00 | 0.35 | 11.9 | 2.8 | |

TABLE 2-3

| Wire No. | Carbonate (mass %) CaCO$_3$ | Na$_2$CO$_3$ | Other | Total amount of carbonate (mass %) | Z value (mass %) | V value | Fe powder (mass %) | Remarks |
|---|---|---|---|---|---|---|---|---|
| 70 | | | | 0.00 | <u>2.94</u> | 9.4 | 2.2 | |
| 71 | | | | 0.00 | 0.57 | <u>29.3</u> | 0.9 | |
| 72 | | | | 0.00 | 0.60 | 6.1 | 5.7 | |
| 73 | | | | 0.00 | 0.68 | 13.5 | 0.9 | |
| 74 | | | | 0.00 | 0.58 | 10.9 | 2.8 | |
| 75 | | | | 0.00 | 0.64 | 7.8 | 4.9 | |
| 76 | | | | 0.00 | 0.62 | 15.0 | 1.3 | |
| 77 | 1.00 | | | <u>1.00</u> | 0.75 | 9.8 | 2.2 | |
| 78 | | | | 0.00 | 0.92 | 5.2 | 5.6 | |
| 79 | | | | 0.00 | 0.18 | <u>27.4</u> | 0.9 | |
| 80 | | | | 0.00 | 0.75 | 10.4 | 2.6 | |
| 81 | | | | 0.00 | 0.85 | 10.1 | 2.9 | |
| 82 | | | | 0.00 | 0.70 | 9.1 | 2.0 | |
| 83 | | | | 0.00 | 0.80 | 11.2 | 4.1 | |
| 84 | | | | 0.00 | 0.85 | 13.7 | 0.9 | |
| 85 | | | | 0.00 | 0.85 | 11.0 | 3.5 | |
| 86 | | | | 0.00 | 1.20 | 7.4 | 1.8 | |
| 87 | | | | 0.00 | 0.32 | 14.5 | 1.5 | |
| 88 | | | | 0.00 | <u>2.95</u> | 6.5 | 0.0 | |
| 89 | | | | 0.00 | 1.20 | 7.6 | 1.8 | |
| 90 | | | | 0.00 | <u>2.03</u> | 9.7 | 2.6 | Wire having seam |
| 91 | | | | 0.00 | 0.42 | 16.1 | 0.0 | |
| 92 | | | | 0.00 | 0.27 | 14.0 | 0.0 | |
| 93 | 0.20 | | | 0.20 | <u>5.71</u> | <u>3.0</u> | 5.0 | |

TABLE 3-1

| Wire No. | Chemical composition (mass %) | | | | | | | | | | | | | | | | | | |
|---|---|---|---|---|---|---|---|---|---|---|---|---|---|---|---|---|---|---|---|
| | C | Si | Mn | P | S | Al | Cu | Ni | Cr | Mo | Nb | V | Ti | B | Bi | Mg | Ca | REM | Ceq |
| 1 | 0.060 | 0.53 | 2.10 | 0.012 | 0.005 | 0.40 | | | | | | | | | 0.015 | 0.30 | | | 0.43 |
| 2 | 0.050 | 0.61 | 2.30 | 0.009 | 0.004 | 0.20 | 0.15 | | | | | | | | 0.015 | 0.25 | | | 0.46 |
| 3 | 0.060 | 0.71 | 2.50 | 0.011 | 0.007 | 0.25 | 0.15 | | | | | | | | 0.015 | 0.30 | | | 0.51 |
| 4 | 0.040 | 0.53 | 2.10 | 0.012 | 0.005 | 0.60 | 0.20 | | | | | | | | 0.015 | 0.30 | | | 0.41 |
| 5 | 0.050 | 0.61 | 2.30 | 0.009 | 0.004 | 0.45 | 0.23 | | | | | | | | 0.015 | 0.60 | | | 0.46 |
| 6 | 0.060 | 0.71 | 2.50 | 0.011 | 0.007 | 0.30 | 0.30 | | | | | | | | 0.015 | 0.30 | | | 0.51 |
| 7 | 0.040 | 0.53 | 2.10 | 0.012 | 0.005 | 0.25 | 0.15 | | | | | | | | 0.015 | 0.42 | | | 0.41 |
| 8 | 0.050 | 0.61 | 2.30 | 0.009 | 0.004 | 0.25 | 0.20 | | | | | | | | | 0.30 | | | 0.46 |
| 9 | 0.060 | 0.71 | 2.50 | 0.011 | 0.007 | 0.15 | 0.25 | | | | | | | | 0.015 | 0.35 | | | 0.51 |
| 10 | 0.040 | 0.53 | 2.10 | 0.012 | 0.005 | 0.25 | 0.25 | | | | | | | | 0.015 | 0.30 | | | 0.41 |
| 11 | 0.050 | 0.61 | 2.30 | 0.009 | 0.004 | 0.10 | 0.15 | | | | | | | | 0.015 | 0.28 | | | 0.46 |
| 12 | 0.060 | 0.71 | 2.50 | 0.011 | 0.007 | 0.25 | 0.15 | | | | | | | | 0.015 | 0.30 | | | 0.51 |
| 13 | 0.003 | 0.50 | 2.20 | 0.012 | 0.005 | 0.20 | 0.20 | | | | | | | | 0.015 | 0.40 | | | 0.39 |
| 14 | 0.120 | 0.48 | 2.10 | 0.009 | 0.004 | 0.32 | 0.23 | | | | | | | | 0.015 | 0.30 | | | 0.49 |
| 15 | 0.040 | 0.45 | 2.00 | 0.011 | 0.007 | 0.28 | 0.30 | | | | | | | | 0.015 | 0.40 | | | 0.39 |
| 16 | 0.050 | 1.00 | 2.90 | 0.012 | 0.005 | 0.20 | 0.15 | | | | | | | | | 0.60 | | | 0.58 |
| 17 | 0.080 | 0.70 | 1.00 | 0.009 | 0.004 | 0.10 | 0.20 | | | 0.20 | | | | | 0.015 | 0.30 | | | 0.33 |

TABLE 3-1-continued

| Wire No. | C | Si | Mn | P | S | Al | Cu | Ni | Cr | Mo | Nb | V | Ti | B | Bi | Mg | Ca | REM | Ceq |
|---|---|---|---|---|---|---|---|---|---|---|---|---|---|---|---|---|---|---|---|
| 18 | 0.060 | 0.50 | 3.50 | 0.011 | 0.007 | 0.20 | 0.21 | | | | | | | | 0.015 | 0.10 | | | 0.66 |
| 19 | 0.055 | 0.80 | 2.20 | 0.030 | 0.005 | 0.30 | 0.23 | | | | | | | | 0.015 | 0.50 | | | 0.46 |
| 20 | 0.060 | 0.50 | 2.10 | 0.015 | 0.020 | 0.28 | 0.20 | | | | | | 0.05 | 0.008 | 0.015 | 0.40 | | | 0.43 |
| 21 | 0.070 | 0.75 | 2.00 | 0.010 | 0.005 | 0.08 | 0.24 | 0.40 | | | | 0.010 | | | | 0.16 | | | 0.45 |
| 22 | 0.060 | 0.70 | 2.10 | 0.013 | 0.005 | 0.70 | 0.20 | | | | | | | | 0.015 | 0.40 | | | 0.44 |
| 23 | 0.060 | 0.50 | 2.40 | 0.010 | 0.007 | 0.20 | 0.50 | | | | | 0.010 | 0.04 | 0.008 | 0.015 | 0.40 | | | 0.48 |
| 24 | 0.060 | 0.60 | 2.10 | 0.010 | 0.005 | 0.20 | 0.20 | 0.60 | | | | | | | 0.000 | 0.60 | | | 0.45 |
| 25 | 0.070 | 0.50 | 2.50 | 0.012 | 0.006 | 0.55 | 0.24 | | 1.00 | | | | | | 0.015 | 0.40 | | | 0.71 |
| 26 | 0.080 | 0.68 | 3.10 | 0.009 | 0.001 | 0.20 | 0.19 | | | 1.00 | | | 0.05 | 0.005 | 0.015 | 0.35 | | | 0.88 |
| 27 | 0.060 | 0.50 | 2.30 | 0.010 | 0.005 | 0.18 | 0.19 | | | | 0.20 | | | | | 0.65 | | | 0.46 |
| 28 | 0.060 | 0.55 | 1.90 | 0.011 | 0.004 | 0.68 | 0.20 | | | | | 0.200 | | | 0.015 | 0.40 | | | 0.41 |
| 29 | 0.040 | 0.50 | 2.10 | 0.005 | 0.005 | 0.20 | 0.14 | | | | | | 0.10 | | 0.015 | 0.15 | | | 0.41 |
| 30 | 0.070 | 0.60 | 2.10 | 0.010 | 0.006 | 0.35 | 0.20 | 0.20 | | | | | 0.07 | 0.020 | 0.015 | 0.40 | | | 0.45 |
| 31 | 0.090 | 0.50 | 2.00 | 0.007 | 0.005 | 0.25 | 0.18 | | | 0.01 | | | | | 0.030 | 0.35 | | | 0.44 |
| 32 | 0.060 | 0.65 | 2.10 | 0.010 | 0.014 | 0.20 | 0.20 | | | | | | | | 0.015 | 0.90 | | | 0.44 |
| 33 | 0.020 | 0.70 | 2.40 | 0.008 | 0.004 | 0.20 | 0.17 | | | 0.01 | | | 0.07 | 0.010 | | 0.60 | 0.50 | | 0.45 |
| 34 | 0.010 | 0.50 | 2.10 | 0.009 | 0.007 | 0.32 | 0.22 | | | | | | | | 0.015 | 0.56 | | 0.010 | 0.38 |
| 35 | 0.040 | 0.50 | 1.50 | 0.010 | 0.005 | 0.28 | 0.25 | | | | | | 0.04 | 0.010 | 0.015 | 0.40 | | | 0.31 |

TABLE 3-2

| Wire No. | C | Si | Mn | P | S | Al | Cu | Ni | Cr | Mo | Nb | V | Ti | B | Bi | Mg | Ca | REM | Ceq |
|---|---|---|---|---|---|---|---|---|---|---|---|---|---|---|---|---|---|---|---|
| 36 | 0.080 | 0.50 | 3.30 | 0.012 | 0.006 | 0.20 | 0.25 | 0.60 | 0.60 | 0.80 | | | | | 0.015 | 0.17 | | | 0.99 |
| 37 | 0.060 | 0.70 | 2.10 | 0.010 | 0.006 | 0.10 | 0.15 | | | | | 0.070 | | | 0.015 | 0.40 | | | 0.44 |
| 38 | 0.060 | 0.50 | 2.10 | 0.011 | 0.005 | 0.20 | 0.15 | | | | | 0.080 | | | | 0.60 | | | 0.44 |
| 39 | 0.070 | 0.60 | 3.00 | 0.008 | 0.005 | 0.25 | 0.20 | | | | | | 0.04 | 0.008 | 0.015 | 0.30 | | | 0.60 |
| 40 | 0.060 | 0.50 | 2.10 | 0.010 | 0.007 | 0.60 | 0.19 | | | | | | | | 0.015 | 0.10 | | | 0.43 |
| 41 | 0.060 | 0.75 | 2.10 | 0.007 | 0.005 | 0.45 | 0.20 | | | | | | | | 0.015 | 0.50 | | | 0.44 |
| 42 | 0.070 | 0.70 | 2.00 | 0.010 | 0.007 | 0.30 | 0.14 | | | | | | | | 0.015 | 0.30 | | | 0.43 |
| 43 | 0.060 | 0.50 | 3.20 | 0.008 | 0.005 | 0.20 | 0.20 | 0.15 | | | | | 0.07 | 0.010 | | 0.40 | | | 0.62 |
| 44 | 0.060 | 0.60 | 2.40 | 0.009 | 0.005 | 0.18 | 0.18 | | | | | | | | 0.015 | 0.17 | | | 0.49 |
| 45 | 0.010 | 0.50 | 2.40 | 0.010 | 0.004 | 0.68 | 0.20 | | | | | | 0.04 | 0.005 | 0.015 | 0.40 | | | 0.43 |
| 46 | 0.060 | 0.50 | 2.10 | 0.012 | 0.007 | 0.20 | 0.17 | 0.15 | | 0.01 | | | | | 0.015 | 0.60 | | | 0.43 |
| 47 | 0.060 | 0.50 | 2.10 | 0.009 | 0.005 | 0.35 | 0.22 | | | 0.20 | | 0.005 | | | 0.015 | 0.30 | | | 0.48 |
| 48 | 0.080 | 0.60 | 2.10 | 0.010 | 0.006 | 0.25 | 0.25 | | | | | | | | | 0.10 | | | 0.46 |
| 49 | 0.060 | 0.50 | 2.10 | 0.011 | 0.005 | 0.20 | 0.25 | | | | | | | | 0.015 | 0.50 | | | 0.43 |
| 50 | 0.060 | 0.50 | 1.60 | 0.008 | 0.005 | 0.32 | 0.20 | 0.50 | | 0.30 | | 0.070 | | | 0.015 | 0.40 | | | 0.44 |
| 51 | 0.040 | 0.80 | 2.10 | 0.010 | 0.004 | 0.28 | 0.23 | | | | | 0.070 | | | 0.015 | 0.16 | | | 0.43 |
| 52 | 0.060 | 0.50 | 2.10 | 0.007 | 0.005 | 0.20 | 0.30 | 0.50 | 0.40 | | | | | | 0.015 | 0.40 | 0.10 | | 0.54 |
| 53 | 0.070 | 0.75 | 1.70 | 0.010 | 0.007 | 0.20 | 0.15 | | | | | | 0.07 | 0.010 | | 0.30 | 0.20 | | 0.38 |
| 54 | 0.060 | 0.70 | 2.10 | 0.008 | 0.005 | 0.20 | 0.20 | | | | | | | | 0.015 | 0.40 | | | 0.44 |
| 55 | 0.060 | 0.50 | 2.40 | 0.009 | 0.006 | 0.08 | 0.25 | | | | | | 0.04 | 0.006 | 0.015 | | | 0.005 | 0.48 |
| 56 | 0.060 | 0.60 | 2.10 | 0.010 | 0.005 | 0.18 | 0.25 | | 0.20 | | | | | | 0.015 | | | | 0.48 |
| 57 | 0.060 | 0.50 | 2.10 | 0.012 | 0.005 | 0.10 | 0.15 | | | | | | | | 0.015 | 0.60 | | | 0.43 |
| 58 | 0.070 | 0.50 | 2.10 | 0.009 | 0.004 | 0.20 | 0.15 | | | | | | | | | 0.30 | | | 0.44 |
| 59 | 0.060 | 0.80 | 3.00 | 0.010 | 0.005 | 0.35 | 0.30 | | | | | | | | 0.015 | 0.10 | | | 0.59 |
| 60 | 0.060 | 0.50 | 2.10 | 0.011 | 0.007 | 0.20 | 0.15 | | | | | | | | 0.015 | 0.50 | | | 0.43 |
| 61 | 0.060 | 0.75 | 2.40 | 0.008 | 0.005 | 0.25 | 0.20 | | | | | | | | 0.015 | 0.40 | | | 0.49 |
| 62 | 0.070 | 0.47 | 2.10 | 0.009 | 0.006 | 0.60 | 0.25 | | | | | | 0.07 | 0.010 | 0.015 | 0.10 | | | 0.44 |
| 63 | 0.060 | 0.50 | 2.10 | 0.010 | 0.005 | 0.45 | 0.25 | | 0.30 | | | | | | | 0.50 | | | 0.49 |
| 64 | 0.060 | 0.60 | 2.10 | 0.010 | 0.005 | 0.30 | 0.20 | | | | | | 0.04 | 0.010 | 0.015 | 0.40 | | | 0.44 |
| 65 | 0.070 | 0.52 | 3.30 | 0.008 | 0.004 | 0.20 | 0.21 | | | | | | | | | 0.30 | | | 0.64 |
| 66 | 0.060 | 0.50 | 2.32 | 0.020 | 0.010 | 0.18 | 0.23 | | | | | | | | | 0.30 | | | 0.47 |
| 67 | 0.060 | 0.50 | 2.10 | 0.010 | 0.007 | 0.68 | 0.20 | | | | | | | | 0.015 | 0.60 | | | 0.43 |
| 68 | 0.060 | 0.70 | 2.10 | 0.012 | 0.005 | 0.25 | 0.23 | 0.55 | | 0.20 | | 0.070 | | | | 0.30 | | | 0.51 |
| 69 | 0.070 | 0.50 | 2.40 | 0.009 | 0.006 | 0.60 | 0.30 | 0.40 | | 0.20 | | 0.070 | | | 0.015 | 0.42 | | | 0.56 |

TABLE 3-3

| Wire No. | C | Si | Mn | P | S | Al | Cu | Ni | Cr | Mo | Nb | V | Ti | B | Bi | Mg | Ca | REM | Ceq |
|---|---|---|---|---|---|---|---|---|---|---|---|---|---|---|---|---|---|---|---|
| 70 | 0.060 | 0.60 | 2.10 | 0.010 | 0.005 | 0.45 | 0.15 | | | | | | | | 0.015 | 0.30 | | | 0.44 |
| 71 | 0.070 | 0.50 | 2.50 | 0.008 | 0.007 | 0.30 | 0.20 | 0.60 | | 0.40 | | | 0.07 | 0.010 | 0.015 | 0.35 | | | 0.62 |
| 72 | 0.090 | 0.75 | 2.10 | 0.009 | 0.005 | 0.20 | 0.21 | | | | | | | | 0.015 | 0.40 | | | 0.47 |
| 73 | 0.060 | 0.50 | 2.10 | 0.010 | 0.006 | 0.25 | 0.23 | | | | | | 0.04 | 0.009 | | 0.17 | | | 0.43 |
| 74 | 0.020 | 0.50 | 2.50 | 0.007 | 0.005 | 0.60 | 0.25 | | | | | | | | 0.015 | 0.40 | | | 0.46 |

TABLE 3-3-continued

| Wire No. | C | Si | Mn | P | S | Al | Cu | Ni | Cr | Mo | Nb | V | Ti | B | Bi | Mg | Ca | REM | Ceq |
|---|---|---|---|---|---|---|---|---|---|---|---|---|---|---|---|---|---|---|---|
| 75 | 0.040 | 0.80 | 2.10 | 0.010 | 0.005 | 0.45 | 0.25 | | | | | | | | 0.015 | 0.60 | | | 0.42 |
| 76 | 0.060 | 0.50 | 2.10 | 0.008 | 0.004 | 0.30 | 0.20 | 0.20 | | | | | | | 0.015 | 0.30 | | | 0.44 |
| 77 | 0.040 | 0.78 | 2.40 | 0.009 | 0.007 | 0.20 | 0.20 | | | | | | | | 0.015 | 0.10 | | | 0.47 |
| 78 | 0.060 | 0.50 | 2.10 | 0.010 | 0.005 | 0.18 | 0.25 | | | | | | | | | 0.42 | | | 0.43 |
| 79 | 0.060 | 0.65 | 2.30 | 0.012 | 0.006 | 0.68 | 0.25 | | 0.20 | | | | 0.07 | 0.007 | 0.015 | 0.30 | | | 0.51 |
| 80 | 0.160 | 0.50 | 2.10 | 0.009 | 0.007 | 0.25 | 0.20 | | | | | | | | 0.015 | 0.35 | | | 0.53 |
| 81 | 0.070 | 0.30 | 2.10 | 0.010 | 0.005 | 0.25 | 0.23 | | | | | | 0.05 | 0.010 | 0.015 | 0.30 | | | 0.43 |
| 82 | 0.090 | 1.50 | 2.10 | 0.011 | 0.006 | 0.60 | 0.30 | | | 0.10 | | | | | 0.015 | 0.28 | | | 0.53 |
| 83 | 0.060 | 0.50 | 0.60 | 0.008 | 0.005 | 0.45 | 0.15 | | | | | | | | | 0.30 | | | 0.18 |
| 84 | 0.020 | 0.50 | 4.00 | 0.010 | 0.005 | 0.30 | 0.22 | | | | | | | | 0.015 | 0.40 | | | 0.71 |
| 85 | 0.010 | 0.70 | 2.10 | 0.007 | 0.004 | 0.04 | 0.15 | | | | | | 0.08 | 0.010 | 0.015 | 0.40 | | | 0.39 |
| 86 | 0.060 | 0.50 | 2.60 | 0.010 | 0.005 | 1.20 | 0.15 | | | | | | | | | 0.16 | | | 0.51 |
| 87 | 0.060 | 0.60 | 2.70 | 0.008 | 0.006 | 0.45 | 0.20 | 1.40 | | | | | 0.04 | 0.008 | 0.015 | 0.40 | | | 0.57 |
| 88 | 0.060 | 0.50 | 3.40 | 0.008 | 0.004 | 0.30 | 0.23 | | 1.00 | 1.00 | | | | | 0.015 | 0.30 | | | 1.10 |
| 89 | 0.060 | 0.75 | 2.10 | 0.009 | 0.007 | 0.20 | 0.30 | | | | | | | | 0.015 | 0.40 | 0.60 | | 0.44 |
| 90 | 0.060 | 0.50 | 2.40 | 0.010 | 0.005 | 0.18 | 0.15 | | | | | | | | 0.015 | 0.17 | | | 0.48 |
| 91 | 0.050 | 0.28 | 2.80 | 0.010 | 0.005 | 0.68 | | 1.60 | 0.10 | 0.25 | 0.01 | 0.010 | | | | | | | 0.65 |
| 92 | 0.080 | 0.22 | 2.00 | | | 0.06 | | 2.00 | 0.10 | | | | | | | | | | 0.49 |
| 93 | 0.040 | 0.50 | 2.30 | | | 0.10 | | | | | | 0.150 | | | | | | | 0.45 |

TABLE 4-1

| Wire No. | Classification | Tensile strength [MPa] | −40° C. Charpy absorbed energy [J] | Amount of spatter generated | Vertical weldability | Bead shape | Slag incorporation | Amount of diffusible hydrogen | Result of y-groove weld cracking test | Result of U-groove weld cracking test | Comprehensive determination |
|---|---|---|---|---|---|---|---|---|---|---|---|
| 1 | Example | 586 | Accepted | Accepted | Accepted | Accepted | Accepted | Accepted | No cracking | No cracking | Accepted |
| 2 | | 595 | Accepted | Accepted | Accepted | Accepted | Accepted | Accepted | No cracking | No cracking | Accepted |
| 3 | | 625 | Accepted | Accepted | Accepted | Accepted | Accepted | Accepted | No cracking | No cracking | Accepted |
| 4 | | 566 | Accepted | Accepted | Accepted | Accepted | Accepted | Accepted | No cracking | No cracking | Accepted |
| 5 | | 595 | Accepted | Accepted | Accepted | Accepted | Accepted | Accepted | No cracking | No cracking | Accepted |
| 6 | | 625 | Accepted | Accepted | Accepted | Accepted | Accepted | Accepted | No cracking | No cracking | Accepted |
| 7 | | 566 | Accepted | Accepted | Accepted | Accepted | Accepted | Accepted | No cracking | No cracking | Accepted |
| 8 | | 595 | Accepted | Accepted | Accepted | Accepted | Accepted | Accepted | No cracking | No cracking | Accepted |
| 9 | | 625 | Accepted | Accepted | Accepted | Accepted | Accepted | Accepted | No cracking | No cracking | Accepted |
| 10 | | 566 | Accepted | Accepted | Accepted | Accepted | Accepted | Accepted | No cracking | No cracking | Accepted |
| 11 | | 595 | Accepted | Accepted | Accepted | Accepted | Accepted | Accepted | No cracking | No cracking | Accepted |
| 12 | | 625 | Accepted | Accepted | Accepted | Accepted | Accepted | Accepted | No cracking | No cracking | Accepted |
| 13 | | 533 | Accepted | Accepted | Accepted | Accepted | Accepted | Accepted | No cracking | No cracking | Accepted |
| 14 | | 645 | Accepted | Accepted | Accepted | Accepted | Accepted | Accepted | No cracking | No cracking | Accepted |
| 15 | | 554 | Accepted | Accepted | Accepted | Accepted | Accepted | Accepted | No cracking | No cracking | Accepted |
| 16 | | 659 | Accepted | Accepted | Accepted | Accepted | Accepted | Accepted | No cracking | No cracking | Accepted |
| 17 | | 569 | Accepted | Accepted | Accepted | Accepted | Accepted | Accepted | No cracking | No cracking | Accepted |
| 18 | | 687 | Accepted | Accepted | Accepted | Accepted | Accepted | Accepted | No cracking | No cracking | Accepted |
| 19 | | 602 | Accepted | Accepted | Accepted | Accepted | Accepted | Accepted | No cracking | No cracking | Accepted |
| 20 | | 585 | Accepted | Accepted | Accepted | Accepted | Accepted | Accepted | No cracking | No cracking | Accepted |
| 21 | | 611 | Accepted | Accepted | Accepted | Accepted | Accepted | Accepted | No cracking | No cracking | Accepted |
| 22 | | 595 | Accepted | Accepted | Accepted | Accepted | Accepted | Accepted | No cracking | No cracking | Accepted |
| 23 | | 607 | Accepted | Accepted | Accepted | Accepted | Accepted | Accepted | No cracking | No cracking | Accepted |
| 24 | | 613 | Accepted | Accepted | Accepted | Accepted | Accepted | Accepted | No cracking | No cracking | Accepted |
| 25 | | 796 | Accepted | Accepted | Accepted | Accepted | Accepted | Accepted | No cracking | No cracking | Accepted |
| 26 | | 859 | Accepted | Accepted | Accepted | Accepted | Accepted | Accepted | No cracking | No cracking | Accepted |
| 27 | | 599 | Accepted | Accepted | Accepted | Accepted | Accepted | Accepted | No cracking | No cracking | Accepted |
| 28 | | 587 | Accepted | Accepted | Accepted | Accepted | Accepted | Accepted | No cracking | No cracking | Accepted |
| 29 | | 564 | Accepted | Accepted | Accepted | Accepted | Accepted | Accepted | No cracking | No cracking | Accepted |
| 30 | | 605 | Accepted | Accepted | Accepted | Accepted | Accepted | Accepted | No cracking | No cracking | Accepted |
| 31 | | 608 | Accepted | Accepted | Accepted | Accepted | Accepted | Accepted | No cracking | No cracking | Accepted |
| 32 | | 592 | Accepted | Accepted | Accepted | Accepted | Accepted | Accepted | No cracking | No cracking | Accepted |
| 33 | | 576 | Accepted | Accepted | Accepted | Accepted | Accepted | Accepted | No cracking | No cracking | Accepted |
| 34 | | 533 | Accepted | Accepted | Accepted | Accepted | Accepted | Accepted | No cracking | No cracking | Accepted |
| 35 | | 520 | Accepted | Accepted | Accepted | Accepted | Accepted | Accepted | No cracking | No cracking | Accepted |

TABLE 4-2

| Wire No. | Classification | Tensile strength [MPa] | −40° C. Charpy absorbed energy [J] | Amount of spatter generated | Vertical weldability | Bead shape | Slag incorporation | Amount of diffusible hydrogen | Result of y-groove weld cracking test | Result of U-groove weld cracking test | Comprehensive determination |
|---|---|---|---|---|---|---|---|---|---|---|---|
| 36 | Example | 954 | Accepted | Accepted | Accepted | Accepted | Accepted | Accepted | No cracking | No cracking | Accepted |
| 37 | | 600 | Accepted | Accepted | Accepted | Accepted | Accepted | Accepted | No cracking | No cracking | Accepted |
| 38 | | 590 | Accepted | Accepted | Accepted | Accepted | Accepted | Accepted | No cracking | No cracking | Accepted |
| 39 | | 666 | Accepted | Accepted | Accepted | Accepted | Accepted | Accepted | No cracking | No cracking | Accepted |
| 40 | | 585 | Accepted | Accepted | Accepted | Accepted | Accepted | Accepted | No cracking | No cracking | Accepted |
| 41 | | 597 | Accepted | Accepted | Accepted | Accepted | Accepted | Accepted | No cracking | No cracking | Accepted |
| 42 | | 598 | Accepted | Accepted | Accepted | Accepted | Accepted | Accepted | No cracking | No cracking | Accepted |
| 43 | | 681 | Accepted | Accepted | Accepted | Accepted | Accepted | Accepted | No cracking | No cracking | Accepted |
| 44 | | 612 | Accepted | Accepted | Accepted | Accepted | Accepted | Accepted | No cracking | No cracking | Accepted |
| 45 | | 555 | Accepted | Accepted | Accepted | Accepted | Accepted | Accepted | No cracking | No cracking | Accepted |
| 46 | | 603 | Accepted | Accepted | Accepted | Accepted | Accepted | Accepted | No cracking | No cracking | Accepted |
| 47 | | 619 | Accepted | Accepted | Accepted | Accepted | Accepted | Accepted | No cracking | No cracking | Accepted |
| 48 | | 610 | Accepted | Accepted | Accepted | Accepted | Accepted | Accepted | No cracking | No cracking | Accepted |
| 49 | | 585 | Accepted | Accepted | Accepted | Accepted | Accepted | Accepted | No cracking | No cracking | Accepted |
| 50 | | 617 | Accepted | Accepted | Accepted | Accepted | Accepted | Accepted | No cracking | No cracking | Accepted |
| 51 | | 585 | Accepted | Accepted | Accepted | Accepted | Accepted | Accepted | No cracking | No cracking | Accepted |
| 52 | | 666 | Accepted | Accepted | Accepted | Accepted | Accepted | Accepted | No cracking | No cracking | Accepted |
| 53 | | 578 | Accepted | Accepted | Accepted | Accepted | Accepted | Accepted | No cracking | No cracking | Accepted |
| 54 | | 595 | Accepted | Accepted | Accepted | Accepted | Accepted | Accepted | No cracking | No cracking | Accepted |
| 55 | | 607 | Accepted | Accepted | Accepted | Accepted | Accepted | Accepted | No cracking | No cracking | Accepted |
| 56 | | 624 | Accepted | Accepted | Accepted | Accepted | Accepted | Accepted | No cracking | No cracking | Accepted |
| 57 | | 585 | Accepted | Accepted | Accepted | Accepted | Accepted | Accepted | No cracking | No cracking | Accepted |
| 58 | | 595 | Accepted | Accepted | Accepted | Accepted | Accepted | Accepted | No cracking | No cracking | Accepted |
| 59 | | 666 | Accepted | Accepted | Accepted | Accepted | Accepted | Accepted | No cracking | No cracking | Accepted |
| 60 | | 585 | Accepted | Accepted | Accepted | Accepted | Accepted | Accepted | No cracking | No cracking | Accepted |
| 61 | | 619 | Accepted | Accepted | Accepted | Accepted | Accepted | Accepted | No cracking | No cracking | Accepted |
| 62 | | 593 | Accepted | Accepted | Accepted | Accepted | Accepted | Accepted | No cracking | No cracking | Accepted |
| 63 | | 636 | Accepted | Accepted | Accepted | Accepted | Accepted | Accepted | No cracking | No cracking | Accepted |
| 64 | | 590 | Accepted | Accepted | Accepted | Accepted | Accepted | Accepted | No cracking | No cracking | Accepted |
| 65 | | 684 | Accepted | Accepted | Accepted | Accepted | Accepted | Accepted | No cracking | No cracking | Accepted |
| 66 | | 601 | Accepted | Accepted | Accepted | Accepted | Accepted | Accepted | No cracking | No cracking | Accepted |
| 67 | | 585 | Accepted | Accepted | Accepted | Accepted | Accepted | Accepted | No cracking | No cracking | Accepted |
| 68 | | 657 | Accepted | Accepted | Accepted | Accepted | Accepted | Accepted | No cracking | No cracking | Accepted |
| 69 | | 679 | Accepted | Accepted | Accepted | Accepted | Accepted | Accepted | No cracking | No cracking | Accepted |

TABLE 4-3

| Wire No. | Classification | Tensile strength [MPa] | −40° C. Charpy absorbed energy [J] | Amount of spatter generated | Vertical weldability | Bead shape | Slag incorporation | Amount of diffusible hydrogen | Result of y-groove weld cracking test | Result of U-groove weld cracking test | Comprehensive determination |
|---|---|---|---|---|---|---|---|---|---|---|---|
| 70 | Comparative Example | 590 | Accepted | Rejected | Accepted | Accepted | Accepted | Accepted | No cracking | No cracking | Rejected |
| 71 | | 715 | Accepted | Accepted | Accepted | Accepted | Rejected | Rejected | Cracking | Cracking | Rejected |
| 72 | | 628 | Accepted | Accepted | Rejected | Accepted | Accepted | Accepted | No cracking | No cracking | Rejected |
| 73 | | 585 | Accepted | Accepted | Accepted | Accepted | Rejected | Accepted | No cracking | No cracking | Rejected |
| 74 | | 573 | Accepted | Rejected | Accepted | Accepted | Accepted | Accepted | No cracking | No cracking | Rejected |
| 75 | | 579 | Accepted | Accepted | Rejected | Rejected | Accepted | Accepted | No cracking | No cracking | Rejected |
| 76 | | 590 | Accepted | Accepted | Accepted | Accepted | Rejected | Accepted | No cracking | No cracking | Rejected |
| 77 | | 600 | Accepted | Accepted | Rejected | Accepted | Accepted | Accepted | No cracking | No cracking | Rejected |
| 78 | | 585 | Accepted | Accepted | Rejected | Rejected | Accepted | Accepted | No cracking | No cracking | Rejected |
| 79 | | 641 | Accepted | Accepted | Accepted | Accepted | Rejected | Accepted | No cracking | No cracking | Rejected |
| 80 | | 687 | Rejected | Accepted | Accepted | Accepted | Accepted | Accepted | No cracking | No cracking | Rejected |
| 81 | | 585 | Accepted | Accepted | Rejected | Accepted | Accepted | Accepted | No cracking | No cracking | Rejected |
| 82 | | 684 | Rejected | Accepted | Accepted | Accepted | Accepted | Accepted | No cracking | No cracking | Rejected |
| 83 | | 474 | Accepted | Accepted | Accepted | Accepted | Accepted | Accepted | No cracking | No cracking | Rejected |
| 84 | | 683 | Rejected | Accepted | Accepted | Accepted | Accepted | Accepted | No cracking | No cracking | Rejected |
| 85 | | 543 | Accepted | Accepted | Rejected | Accepted | Accepted | Accepted | No cracking | No cracking | Rejected |
| 86 | | 621 | Rejected | Rejected | Accepted | Accepted | Accepted | Accepted | No cracking | No cracking | Rejected |
| 87 | | 670 | Accepted | Accepted | Accepted | Accepted | Accepted | Accepted | No cracking | Cracking | Rejected |
| 88 | | 1023 | Rejected | Rejected | Accepted | Accepted | Accepted | Accepted | No cracking | No cracking | Rejected |
| 89 | | 597 | Accepted | Rejected | Accepted | Accepted | Accepted | Accepted | No cracking | No cracking | Rejected |
| 90 | | 607 | Accepted | Rejected | Accepted | Accepted | Accepted | Accepted | No cracking | No cracking | Rejected |
| 91 | | 716 | Accepted | Accepted | Rejected | Accepted | Accepted | Accepted | No cracking | Cracking | Rejected |
| 92 | | 652 | Accepted | Accepted | Rejected | Accepted | Accepted | Accepted | No cracking | Cracking | Rejected |
| 93 | | 590 | Accepted | Rejected | Rejected | Rejected | Accepted | Accepted | No cracking | No cracking | Rejected |

TABLE 5

| | Welding condition | | | | | | | | |
|---|---|---|---|---|---|---|---|---|---|
| Condition No. | Current [A] | Voltage [V] | Welding rate [cm/min] | Heat input [kJ/cm] | Preheating temperature [° C.] | Kind of gas | Gas flow rate [l/min] | Other | Evaluation contents |
| 1 | 270 | 30 | 30 | 16.2 | No | 100% $CO_2$ | 25 | Downhand welding Multilayer building | Tension test, Charpy impact test |
| 2 | 270 | 30 | 30 | 16.2 | No | | | Downhand welding | Evaluation of spatter amount |
| 3 | 200 | 23 | 15 | 18.4 | No | | | Vertical welding Weaving | Evaluation of vertical weldability, evaluation of bead shape, evaluation of slag incorporation |
| 4 | 270 | 30 | 35 | 13.9 | No | | | Downhand welding | measurement of amount of diffusible hydrogen |
| 5 | 270 | 30 | 30 | 16.2 | No | | | Downhand welding | y-groove weld cracking test |
| 6 | 270 | 30 | 30 | 16.2 | No | | | Downhand welding | U-groove weld cracking test |

Furthermore, steel plates having a plate thickness of 12 mm with a Pcm of 0.36%, a plate thickness of 25 mm with a Pcm of 0.33%, a plate thickness of 40 mm with a Pcm of 0.31%, and a plate thickness of 100 mm with a Pcm of 0.29% were welded to their original thicknesses at a temperature of 5° C. and a humidity of 60% without performing preheating using Wires 3, 10, 25, and 65 in the examples disclosed in Tables 1-1 to 3-2 under the welding conditions shown in Table 5, and the welded joints obtained therefrom were subjected to a y-groove weld cracking test and a U-groove weld cracking test. As a result, it was confirmed that there was no crack in the surface and cross sections in all the welded joints.

INDUSTRIAL APPLICABILITY

With the flux-cored wire according to the present invention, a weld having high strength, high toughness, excellent cold-cracking resistance properties, and a good bead shape can be obtained, the amount of spatter generated during welding can be significantly reduced, and the viscosity of molten metal during welding can be increased. The manufacturing method of a welded joint according to the present invention can be applied to all-position welding, make a preheating operation for preventing cracking in the weld metal unnecessary or significantly reduced, and significantly reduce the amount of spatter generated. The welded joint according to the present invention has a weld having high strength, high toughness, and a good bead shape. In particular, in a case where the flux-cored wire and the manufacturing method of a welded joint according to the present invention are applied to welding of a high strength steel of 590 MPa or more, vertical welding can be performed, and a preheating operation for suppressing cold-cracking is made unnecessary or significantly reduced. Furthermore, even in use in welding in which the shielding gas is a gas that easily generates spatter, such as 100% $CO_2$, the generation of spatter is suppressed, so that the welding efficiency can be significantly improved. Therefore, the flux-cored wire and the manufacturing method of a welded joint according to the present invention are valuable in industry.

BRIEF DESCRIPTION OF THE REFERENCE SYMBOLS

1: steel plate
2: backing strip
3: weld bead
4: 2 mm V notch Charpy impact test piece
5: round bar tension test piece, oxygen analysis test piece
6: gap

The invention claimed is:
1. A flux-cored wire comprising:
   a steel sheath; and
   a flux filling the inside of the steel sheath,
   wherein the flux contains
      a fluoride including 0.11% or more in total of one or more selected from the group consisting of $CaF_2$, $MgF_2$, LiF, NaF, $K_2ZrF_6$, $BaF_2$, $K_2SiF_6$, and $Na_3AlF_6$ in terms of F-equivalent value with respect to a total mass of the flux-cored wire,
      4.30% to 7.50% of a Ti oxide in terms of $TiO_2$-equivalent value with respect to the total mass of the flux-cored wire,
      0.30% to 2.40% in total of an oxide including one or more selected from the group consisting of a Fe oxide, a Ba oxide, a Na oxide, a Si oxide, a Zr oxide, a Mg oxide, an Al oxide, a Mn oxide, and a K oxide in terms of equivalent value of each of FeO, BaO, $Na_2O$, $SiO_2$, $ZrO_2$, MgO, $Al_2O_3$, $MnO_2$, and $K_2O$ with respect to the total mass of the flux-cored wire, excluding the Ti oxide and a Ca oxide, and
      0% to 0.60% in total of a carbonate including one or more selected from the group consisting of $MgCO_3$,

$Na_2CO_3$, $LiCO_3$, $CaCO_3$, $K_2CO_3$, $BaCO_3$, $FeCO_3$, and $MnCO_3$ in terms of mass % with respect to the total mass of the flux-cored wire, an amount of the Ca oxide in terms of CaO equivalent is 0% or more and less than 0.20% in terms of mass % with respect to the total mass of the flux-cored wire, an amount of the $CaF_2$ is 0% or more and less than 0.50% in terms of mass % with respect to the total mass of the flux-cored wire, a chemical composition of the flux-cored wire excluding the fluoride, the oxide, the Ti oxide, the Ca oxide, and the carbonate includes, in terms of mass % with respect to the total mass of the flux-cored wire, C: 0.003% to 0.120%,
Si: 0.45% to 1.00%,
Mn: 1.00% to 3.50%,
P: 0.030% or less,
S: 0.020% or less,
Al: 0.08% to 0.70%,
Cu: 0% to 0.50%,
Ni: 0% to 0.60%,
Cr: 0% to 1.00%,
Mo: 0% to 1.00%,
Nb: 0% to 0.20%,
V: 0% to 0.200%,
Ti: 0% to 0.10%,
B: 0% to 0.020%,
Bi: 0% to 0.030%,
Mg: 0% to 0.90%,
Ca: 0% to 0.50%,
REM: 0% to 0.0100%, and
a remainder consisting of Fe and impurities,
a Z value calculated by Formula 1 is 2.00% or less,
a V value calculated by Formula 2 is 5.0 to 27.0, and
Ceq calculated by Formula 3 is 0.30% to 1.00% or less, $$Z=0.7\times([Na_3AlF_6]+[NaF]+[MgF_2])+0.8\times([K_2SiF_6]+[K_2ZrF_6])+0.9\times([LiF]+[BaF_2])+3.5\times([CaF_2]): \quad \text{Formula 1}$$

$$V=([TiO_2]+1.2\times[SiO_2]+1.4\times[Al_2O_3]+1.5\times[ZrO_2])/(F)^{1/2}: \quad \text{Formula 2}$$

$$Ceq=[C]+[Si]/24+[Mn]/6+[Ni]/40+[Cr]/5+[Mo]/4+[V]/14: \quad \text{Formula 3}$$

where each chemical formula enclosed by square brackets in Formula 1 indicate an amount of a compound corresponding to the chemical formula in terms of mass % with respect to the total mass of the flux-cored wire, each chemical formula enclosed by square brackets in Formula 2 indicates an amount of a compound corresponding to the chemical formula in terms of equivalent values of the compounds with respect to the total mass of the flux-cored wire, F in Formula 2 indicates a total amount of the fluoride in terms of F-equivalent value, and each element symbol enclosed by square brackets in Formula 3 indicates an amount of an element corresponding to the element symbol contained in the chemical composition of the flux-cored wire excluding the fluoride, the oxide, the Ti oxide, the Ca oxide, and the carbonate in terms of mass % with respect to the total mass of the flux-cored wire.

2. The flux-cored wire according to claim 1,
wherein the total amount of the fluoride in terms of the F-equivalent value with respect to the total mass of the flux-cored wire is 0.50% or more.

3. The flux-cored wire according to claim 1,
wherein the Z value is 1.80% or less.

4. The flux-cored wire according to claim 1,
wherein a total amount of the $Na_3AlF_6$, the NaF, and the $MgF_2$ in terms of mass % with respect to the total mass of the flux-cored wire to a total amount of the fluoride in terms of mass % with respect to the total mass of the flux-cored wire is 0.50% or more.

5. The flux-cored wire according to claim 1,
wherein the steel sheath has a seamless shape.

6. The flux-cored wire according to claim 1,
wherein the steel sheath has a slit-like gap.

7. The flux-cored wire according to claim 1, further comprising:
a perfluoropolyether oil applied to a surface of the flux-cored wire.

8. The flux-cored wire according to claim 1,
wherein an amount of hydrogen in the flux-cored wire is 12 ppm or less with respect to the total mass of the flux-cored wire.

9. The flux-cored wire according to claim 1,
wherein the amount of the $CaF_2$ in terms of mass % with respect to the total mass of the flux-cored wire is less than 0.20%.

10. A manufacturing method of a welded joint comprising:
performing gas shielded arc welding on a steel using the flux-cored wire according to claim 1.

11. The manufacturing method of a welded joint according to claim 10,
wherein the steel is one selected from the group consisting of
a steel plate having a plate thickness of 12 mm or less and a Pcm of 0.36% or less,
a steel plate having a plate thickness of more than 12 mm and 25 mm or less and a Pcm of 0.33% or less,
a steel plate having a plate thickness of more than 25 mm and 40 mm or less and a Pcm of 0.31% or less, and
a steel plate having a plate thickness of more than 40 mm and 100 mm or less and a Pcm of 0.29% or less, and
when the gas shielded arc welding is performed on the steel, in a case where a temperature of the steel is lower than 5° C., the steel is preheated to cause the temperature of the steel to be 5° C. or higher, and in a case where the temperature of the steel is 5° C. or higher, the gas shielded arc welding is performed without preheating the steel,
where Pcm is calculated by Formula 4, $$Pcm=[C]+[Si]/30+[Mn]/20+[Cu]/20+[Ni]/60+[Cr]/20+[Mo]/15+[V]/10+5\times[13]; \quad \text{Formula 4}$$

provided that each element symbol to which square brackets are added indicates an amount of an element corresponding to the element symbol contained in the steel in terms of unit mass %.

12. A welded joint obtained by the manufacturing method of a welded joint according to claim 10.

* * * * *